US 6,413,621 B1

(12) United States Patent
Mayes et al.

(10) Patent No.: US 6,413,621 B1
(45) Date of Patent: Jul. 2, 2002

(54) POLYMERIC MEMBRANES AND OTHER POLYMER ARTICLES HAVING DESIRED SURFACE CHARACTERISTICS AND METHOD FOR THEIR PREPARATION

(75) Inventors: Anne M. Mayes, Waltham, MA (US); David G. Walton, White Bear Lake, MN (US); Jonathan F. Hester, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/258,526

(22) Filed: Feb. 26, 1999

Related U.S. Application Data

(63) Continuation-in-part of application No. PCT/US97/16488, filed on Aug. 26, 1997, which is a continuation of application No. 08/819,610, filed on Mar. 17, 1997, now abandoned
(60) Provisional application No. 60/024,579, filed on Aug. 26, 1996, now abandoned.

(51) Int. Cl.[7] .......................... B01D 67/00; B32B 27/30
(52) U.S. Cl. ...................... 428/212; 428/409; 428/520; 428/522; 428/315.5; 525/223
(58) Field of Search ................................. 428/409, 515, 428/522, 315.5, 318.4, 520, 212; 427/336, 372.2; 525/223

(56) References Cited

U.S. PATENT DOCUMENTS

| | | | |
|---|---|---|---|
| 4,578,414 A | 3/1986 | Sawyer et al. | |
| 4,698,388 A | 10/1987 | Ohmura et al. | |
| 4,810,582 A | 3/1989 | Gould et al. | |
| 4,861,830 A | 8/1989 | Ward, Jr. | |
| 4,886,836 A | 12/1989 | Gsell et al. | |

(List continued on next page.)

FOREIGN PATENT DOCUMENTS

| | | |
|---|---|---|
| EP | 0407 900 A2 | 1/1991 |
| EP | 0 614 923 A1 | 9/1994 |
| WO | WO90/11820 | 10/1990 |
| WO | WO 98/08595 | * 3/1998 |

OTHER PUBLICATIONS

Beihoffer, T.W. et al., "Hydrophilic modification of engineering polymers," pp. 1626–1632, Polymer, vol. 27, (Oct., 1986).

Dasgupta, Sunil, "Surface Modification of Polyolefins for Hydrophilicity and Bondability; Ozonization and Grafting Hydrophilic Monomers on Ozonized Polyofins," pp. 233–248, Journal of Applied Polymers Science, vol. 41, (1990).

(List continued on next page.)

Primary Examiner—Paul Thibodeau
Assistant Examiner—D. Lawrence Tarazano
(74) Attorney, Agent, or Firm—Wolf, Greenfield & Sacks, P.C.

(57) ABSTRACT

Polymeric articles, including membranes, with surfaces having a desired chemical functionality are created by surface segregation of a branched component blended with a compatible, matrix base component, the branched component having the desired chemical functionality. In particular, hydrophilic surfaces are created via surface segregation of a branched hydrophilic copolymer blended into a polymer matrix. The use of branched molecular architecture provides a thermodynamic mechanism for the segregation of the hydrophilic species to the surface and a means for achieving a high surface coverage of the hydrophilic moiety. The branched hydrophilic copolymer can be defined by a random copolymer including two or more methacrylate or acrylate monomers, at least one of which features a short hydrophilic side chain, such as a polyethylene glycol side chain. The branched hydrophilic copolymer is compatible, and well-entangled, with the acrylate polymer matrix.

27 Claims, 14 Drawing Sheets

U.S. PATENT DOCUMENTS

| | | | |
|---|---|---|---|
| 4,923,914 A | 5/1990 | Nohr et al. |
| 5,030,352 A | 7/1991 | Varady et al. |
| 5,057,262 A | 10/1991 | Nohr et al. |
| 5,066,401 A | 11/1991 | Muller et al. |
| 5,079,272 A | 1/1992 | Allegrezza, Jr. et al. |
| 5,098,569 A | 3/1992 | Stedronsky |
| 5,120,888 A | 6/1992 | Nohr et al. |
| 5,139,881 A | 8/1992 | Henis et al. |
| 5,158,721 A | 10/1992 | Allegrezza, Jr. et al. |
| 5,190,989 A | 3/1993 | Himori |
| 5,258,221 A | 11/1993 | Meirowitz et al. |
| 5,306,561 A | 4/1994 | Frechet et al. |
| 5,328,951 A | 7/1994 | Gardiner |
| 5,344,862 A | 9/1994 | Nohr et al. |
| 5,470,892 A | 11/1995 | Gupta et al. |
| 5,470,893 A | 11/1995 | Sinclair-Day et al. |
| 5,494,855 A | 2/1996 | Nohr et al. |
| 5,738,111 A | 4/1998 | Weimer et al. |
| 6,150,459 A | 11/2000 | Mayes et al. |
| 6,207,749 B1 | 3/2001 | Mayes et al. |

OTHER PUBLICATIONS

Downes, S. et al., "Modifications of the hydrophilicity of heterocylcic methacrylate copolymers for protein release," pp. 1417–1421, Biomaterials, vol. 16, No. 18 (1995).

Okano, Teruo et al., "Hydrophilic–hydrophobic microdomain surfaces having an ability to suppress platelet aggregation and their in vitro antithrombogenicity," pp. 919–927, Journal of Biomedical Materials Research, vol. 20, (1986).

Yethiraj, Arun, "Entropic and Enthalpic Surface Segregation from Blends of Branched and Linear Polymers," Physical Review Letters, vol. 74, No. 11, (Mar. 13, 1995).

Abstract: Eda, et al., "Synthesis of polymer latices with segregated hydrophilic domains by means of seeded copolymerization method", Kobunshi Ronbunshu, 47:8, 667–73 (1990).

Abstract: Ohgaki, "Surface properties of acrylic/isocyanate coating blended with (A–B)n type block polymers having both hydrophilic and hydrophobic segment", Techno–cosmos, 8:2–9 (1995).

Kojima, T. et al., "Selective permeation of metal ions through cation exchange membrane carrying N–(8–quinolyl)–sulfonamide as a chelating ligand", Journal of Membrane Science 102 (1995) 49–54.

Ito, Yoshihiro et al., "pH–Sensitive Gating by Conformational Change of a Polypeptide Brush Grafted onto a Porous Polymer Membrane", J. Am. Chem. Soc. 1997, 119, 1619–1623.

Mika, A.M. et al., "A new class of polyelectrolyte–filled microfiltration membranes with environmentally controlled porosity", Journal of Membrane Science, 108, 1995, 37–56.

Israels, Rafel et al., "pH–Controlled Gating in Polymer Brushes", Macromolecules, 1994, 27, 6679–6682.

Walton, D.G. and Mayes, A.M., "Entropically driven segregation in blends of branced and linear polymers," Physical Review2 Letters, vol. 54, No. 3, pp. 2811–2815, Sep. 1996.

* cited by examiner

POLYMERIC MEMBRANES AND OTHER POLYMER ARTICLES HAVING DESIRED SURFACE CHARACTERISTICS AND METHOD FOR THEIR PREPARATION

This application is a continuation-in-part of co-pending International Patent Application Ser. No. PCT/US97/16488, filed Aug. 26, 1997, which claims priority to U.S. application. Ser. No. 08/819,610, filed Mar. 17, 1997 and to 60/024,579, filed Aug. 26, 1996 (abandoned).

FIELD OF THE INVENTION

The invention relates generally to polymer articles having modified surfaces, such as an essentially hydrophobic polymer article having a hydrophilic surface resulting from entropically-enhanced migration of a miscible, hydrophilic component to the surface of the article.

A membrane having a hydrophobic core and a hydrophilic surface component is provided as well.

BACKGROUND OF THE INVENTION

Control of the surface chemistry of polymeric articles and compositions has technological relevance to a variety of commercially-important areas such as the medical devices industry, personal products, coatings, membranes, etc. Many polymeric articles and compositions that are useful in these areas are defined by a particular type of material because of economic considerations or mechanical requirements. For example, an essentially hydrophobic material might be used for structural reasons where it would be desirable to provide a different type of surface, for example a hydrophilic surface, on the article. Other examples involve imparting a chemical functionality to a surface such as a chelating functionality or other functionality that can selectively remove particular species from solution, or otherwise expose a desired chemical characteristic. While many techniques exist for modifying surface properties of polymers, many involve multi-step processes and/or do not result in thermodynamically or physically-stable incorporation of surface-modifying components.

It is often a goal in polymer chemistry to create a polymer article having a surface of high surface tension (surface energy) relative to the article as a whole, since higher surface tension typically corresponds to better wettability. However, in polymer blends including a higher surface energy component and a lower surface energy component the lower surface energy component (lower wettability component) tends to be present disproportionately at the surface since surface energy is characterized by inter-molecular attraction. That is, thermodynamic considerations result in the component with the higher inter-molecular attraction residing below the surface where it can be surrounded by a higher number of like molecules, while the lower surface energy component resides at the surface where a molecule is inherently surrounded by less like molecules. Techniques exist for creating polymeric materials having higher surface tension components at the surface, but a problem typically encountered with conventional methods is the tendency of the surface to reconstruct over time through chain reorientation where the lower surface tension component migrates to the surface of the polymer. (e.g., Wu, Supra; Garbassi, et al., Supra). Such reconstruction is consequently accompanied by an irrevocable loss of desired surface properties.

The control of surface properties of acrylate polymers has technological relevance to areas including biomedical devices, latex paints and other coatings, textiles, and recording media. However, conventional techniques for modification of acrylate polymer surface chemistry typically is achieved through kinetically-governed processes that allow little control over the final surface composition and structure. Plasma and flame treatments, commonly employed to oxygenate surfaces in order to improve wetting and/or adhesion, invoke reaction cascades of bond scission, fragmentation, and crosslinking, yielding poorly-defined surface compositions. Chemical oxidation by acid treatment typically causes pitting and solubilization that modifies surface morphology in an uncontrolled fashion (E.g., Wu, *Polymer Interface and Adhesion* (Marcel Dekker, Inc., New York, 1982); Garbassi, et al., *Polymer Surfaces: From Physics to Technology* (John Wiley & Sons, West Sussex, 1994)). Grafting methods used to bond hydrophilic species like heparin or poly(ethylene glycol) to surfaces in order to improve biocompatibility typically yield low surface coverages (E.g., Pekna, et al., *Biomaterials*, 14, 189 (1993); Harris, J. M., ed., *Poly(ethylene glycol) Chemistry: Biotechnical and Biomedical Applications* (Plenum Press, New York, 1992)).

An alternative method of preparing a hydrophilic surface on a hydrophobic polymer article might be through the addition of a hydrophilic species to the polymer which selectively segregates to the surface upon processing, providing the desired surface hydrophilicity. This approach would be particularly useful if the hydrophilic additive were miscible with the polymer, so as not to adversely influence the bulk properties of the article, such as mechanical behavior or optical clarity. One such candidate additive might be poly(ethylene oxide), PEO, because of its high degree of hydrophilicity and well-known resistance to protein adsorption. PEO is known to be miscible in poly(methyl methacrylate) up to very high concentrations. It is also known, however, that the surface tension of PEO is somewhat higher than that of PMMA. From this, we would assume that a surface of an article prepared from a PMMA/PEO blend should be depleted with PEO, in order to reduce the surface energy. It has been reported that neither component is enhanced at the surface of such blends (Sakellariu, Polymer, 34, 3408, (1993)). However, in this study samples were annealed for only three hours at 170 C.

Membrane technology presents a particularly interesting challenge in connection with surface functionalization. The use of polymer membranes for water treatment has become increasingly widespread in the past thirty years in such applications as desalination of sea and brackish water, water softening, production of ultrapure water, and purification of industrial wastewater. Membrane processes have additionally been used to generate ultrapure water sources for the electronics and pharmaceutical industries, and to treat wastewater from such diverse industries as textiles and laundry, electroplating and metal finishing, petroleum and petrochemical, food and beverage, and pulp and paper.

Membrane processes offer significant advantages over conventional water treatment technologies. They require no phase change and are thus inherently less energy-intensive than distillation methods used for desalination. They provide an absolute filter for pollutants above a given pore size, and are hence more reliable than flocculation methods that can leave residuals in treated water if improperly performed. In addition, the modular and compact design of membrane filtration units offers great flexibility in the scale of operation. And because membranes can separate pollutants without chemical alteration, they allow for more cost-effective recovery of valuable components from wastewater.

However, membrane technologies suffer from critical materials-related drawbacks that limit their efficiency and lifetime, and hence cost-effectiveness in water treatment applications. In particular, membrane fouling is a major problem which results in reduced efficiency due to flux decline, high cleaning and maintenance costs, and low membrane lifetimes. The cleaning and replacement costs for ultrafiltration processes are estimated to account for 24% and 23%, respectively, of the total process costs. While careful system operation and flow-pattern design can reduce fouling by suspended particulates or precipitated salts, the adsorption of proteins onto membrane surfaces is more insidious, generating a monolayer film that provides a foothold for slower deposition processes which deteriorate membrane performance and lifetime substantially. Membranes used in reverse osmosis processes have additional materials-related limitations. While the cellulose acetate-based membranes most commonly found in this application exhibit high flux and good salt rejection, these polymers hydrolyze over time, generating physical holes in the membrane which reduces its useful lifetime. Clearly, the need exists for new membrane materials with improved fouling resistance and longer service lifetimes. Moreover, membranes with improved selectivity are sought for more cost-effective recovery of wastewater constituents.

Methods to impart hydrophilicity to hydrophobic membrane surfaces have primarily focused on the grafting or coating of hydrophilic species directly onto membranes. In general, this approach suffers from several drawbacks: 1) achievable grafting densities are typically low due to kinetic limitations, 2) grafting reactions require an additional processing step and are difficult to scale up, 3) grated monolayers are susceptible to wear or removal during membrane cleaning procedures. An appealing alternative approach which might circumvent these problems is the addition of a hydrophilic macromolecular component to the membrane material that selectively segregates to the membrane surface during processing. Membrane materials prepared by this approach can offer important performance and processing advantages over commercial membrane materials as well as coated and graft-modified membranes. Unlike typical coated membranes, the surfaces of these membranes present an additive which is intimately entangled with the matrix. Furthermore, where segregation can be accomplished through a thermodynamic driving force, "self-healing" membranes are possible, whereby surface-active additive material removed from the membrane surface can be replaced by further segregation of the branched component, optionally during a periodic annealing operation. Finally, surface localization of the branched component can occur during a standard processing step, thus eliminating the need for additional membrane fabrication steps.

A variety of surface-modification techniques have been described in the patent literature. For example, Varady, et al., in U.S. Pat. No. 5,030,352, describes modification of a hydrophobic chromatography solid phase with a block copolymer including hydrophobic domains and hydrophilic domains. The hydrophobic domains associate with the solid phase via hydrophobic-hydrophobic interaction, and the hydrophilic domains extend outwardly away from the surface. The technique involves the step of crosslinking the block copolymer in place to produce a hydrophilic surface coating masking hydrophobic regions of the solid phase.

Stedronsky, in U.S. Pat. No. 5,098,569, describes a surface-modified membrane including a modifying polymer adsorbed onto a surface of the membrane and uniformly crosslinked thereon.

Nohr, et al., in U.S. Pat. Nos. 4,923,914, 5,120,888, 5,344,862, 5,494,855, and 5,057,262, describe thermoplastic compositions designed to expose a particular desired surface characteristic. Typically, Nohr, et al. employ a hydrophilic additive that is immiscible (incompatible) with the bulk polymeric component under ambient conditions, and therefore is driven to the surface of the blend upon solidification due to this incompatibility (via enthalpy). In U.S. Pat. No. 5,494,855, Nohr, et al. described blends including additives having good tensile properties or surface wettability. Formulation of a blend having good surface wettability involves an additive having a molecular weight of as low as from about 350 to about 1,200. Low molecular weight additives typically migrate more readily in blends and articles, thus it would not be unreasonable to assume that in this patent there is a teaching that advantageous mechanical properties resulting from a higher molecular weight additive and advantageous surface properties resulting from migration of a lower molecular weight additive are mutually exclusive. Nohr, et al. use fumed silica to aid segregation.

U.S. Pat. No. 4,698,388 (Ohmura, et al.) describes a block copolymer additive for modifying the surface of polymeric material. The block copolymer includes a matrix-compatible portion and a portion having a characteristic desirably present at the surface which is incompatible with the matrix. Due to the incompatibility of the surface-modifying portion of the block copolymer, that portion is segregated to the surface while the compatible portion interacts with the polymer matrix to retain the additive in the matrix. U.S. Pat. No. 4,578,414 (Sawyer, et al.) describes fine denier, wettable fibers and/or filaments prepared from olefin polymers including a relatively short, polymeric wetting agent including a hydrophilic domain and a hydrophobic domain. The additive segregates such that the hydrophilic domain modifies the surface.

Allegrezza, et al., in U.S. Pat. Nos. 5,079,272 and 5,158,721, describe a porous membrane defined by an interpenetrating polymer network of a hydrophobic polymer and an in-situ-crosslinked, interpenetrating hydrophilic polymer. The described technique includes the step of annealing the network, whereby the hydrophobic component crystallizes, "excluding" the hydrophilic component to the surface.

U.S. Pat. No. 5,190,989 (Himori) describes an AB-type block copolymer having a hydrophilic group and a group having an affinity for a resin. The block copolymer is oriented with the hydrophilic component toward the surface or interface of the resin.

Meirowitz, et al., in U.S. Pat. No. 5,258,221, describe a two-step process in which a surface of a hydrophobic polyolefin article is modified by contacting the surface with a copolymeric material above the glass transition temperature of the polyolefin to fuse the copolymeric material to the polyolefin. The copolymeric material includes a hydrophobic moiety compatible with the polyolefin and a modifying moiety (e.g. hydrophilic) incompatible with the polyolefin.

U.S. Pat. No. 5,328,951 (Gardiner) describes a technique for increasing the surface energy of an organic polymeric article, in particular a polyolefin article, by forming a blend including a base polymer and an amphiphile having a molecular weight of from about 150 to about 500 Daltons. The amphiphile has a lipophilic component compatible with the base polymeric material, which is thought to anchor the amphiphile in the base polymer, and a hydrophilic component less compatible with the polymeric base which resides at the surface of the article.

Membranes from miscible blends of PVDF with from 5% to 34% poly(methyl methacrylate) (PMMA) are reported by Nunes, et al., "Ultrafiltration Membranes From PVDF/

PMMA Blends", *J. Memb. Sci.*, 73, 25–35, 1992; Ito, et al., "pH-Sensitive Gating by Conformational Change of a Polypeptide Brush Grafted onto a Porous Polymer Membrane", *J. Am. Chem. Soc.*, 119, 1619–1623 (1997) describe graft-polymerization of benzyl glutamate NCA onto a porous PTFE membrane, and a study of the effects of pH and ionic strength on permeation rate. The rate of water permeation through the membrane was found to be slow under high-pH conditions and fast under low-pH conditions since, under high-pH conditions, randomly coiled graft chains extended to close the pores. Kojima, et al., "Selective Permeation of Metal Ions Through Cation Exchange Membrane Carrying N-(8-quinolyl)-sulfonamide as a Chelating Ligand", *Journal of Membrane Science*, 102, 49–54 (1995) describe chemical attachment of a chelating reagent, selective for $Cu^{2+}$ over $Fe^{3+}$, to side chains of a polymer to create a cation exchange membrane. This polymer was diluted in a solvent and impregnated into a porous Teflon™ PTFE membrane and the solvent was evaporated. Mika, et al., "A New Class of Polyelectrolyte-Filled Microfiltration Membranes with Environmentally Controlled Porosity", *Journal of Membrane Science*, 108, 37–56 (1995) describe grafting of 4-vinylpyridine onto polyethylene and polypropylene microfiltration membranes. Grafting is UV-induced and results in membranes showing a pH valve effect and the capability of rejecting small inorganic ions in the presence of reverse osmosis.

Iwata, et al. ("Preparation and Properties of Novel Environmental-Sensitive Membranes Prepared by Graft Polymerization Onto a Porous Membrane", *J. Memb. Sci.*, 38, 185–199, 1988) report a glow discharge technique to graft polyacrylamide and polyacrylic acid chains onto polyvinylidene fluoride (PVDF) membrane. The permeation rates and separation characteristics of membranes so treated were found to vary significantly with pH and ionic strength of the feed solution, both of which influence the configurations of the grafted chains. Variations in the pH and ionic strength of the feed solution vary the extent to which electrostatic forces between the charges along the grafted polyion chains are screened. At low pH, the negative charges along the grafted chains are heavily screened by positive counterions, and the chains adopt random coil like configurations. At high pH, the grafted chains are dissociated, and they adopt extended configurations due to electrostatic repulsion between the negative charges spaced along them, effectively blocking the pores. Addition of methanol (a poor solvent for PAAm and PAA) was shown to be another method of collapsing the grafted chains. While significant, the variations in permeation rate were not as pronounced as those demonstrated in the system of Ito, et al, which were probably emphasized by the helix-coil transition which occurs in that system. Hautojarvi, et al, (*J. Memb. Sci.*, 108, 37, 1995) published a similar study of PVDF membranes graft-modified with poly(acrylic acid).

In many prior techniques for modifying surfaces, durability of the modified surface and/or physical or optical characteristics of the article may be compromised. In particular, where a surface-modifying component is water-soluble, the component can become disassociated from the polymer surface over time if the article is used in an aqueous environment and the surface-modifying component is not securely associated with the article. Polymer blends that exploit the incompatibility of a surface-modifying component run the risk of formation of micelles or other segregated groupings within the polymer, which can render a polymer opaque (disadvantageous in many circumstances). Since incompatibility is the property necessary for segregation in many techniques, these techniques inherently carry these potential drawbacks.

The academic literature describes studies involving surface migration of components of a polymer blend based upon their architecture. For example, Steiner, et al., *Science*, 258, 1126 25 (1992) and Sikka, et al., *Phys. Rev. Lett.*, 70, 307 (1993), describe experiments on polyolefin blends demonstrating that, where components of the blends are similar in energy, more highly-branched components tend to segregate to the surface of the article. However, there is some controversy in the literature in that Steiner, et al. (Supra) report that it is not clear that surface migration of the more highly-branched polyolefin occurs due to its architecture. Indeed, in these systems since the more branched component is the lower surface tension component the more branched component would be expected to reside at the surface according to the reported technique.

Accordingly, it is an object of the present invention to provide a simple, inexpensive technique for generating thermodynamically-stable polymeric articles having a desired surface property. In particular, it is an object to provide a technique for generating thermodynamically-stable, relatively high-surface-energy surfaces on polymeric articles for a variety of purposes. It is another object of the invention to provide stable hydrophilic surfaces on various acrylate polymers to improve emulsification in latex paints, impart resistance to static charge build-up on compact discs and textiles, improve anti-fouling properties of intraocular lenses and dental composites, and increase the wettability of acrylates to inks, glues, and paints. It is another object of the invention to provide straightforward techniques for creation of membranes of a variety of polymers having desired surface properties, and robust membranes having desired exposed functionality.

SUMMARY OF THE INVENTION

The present invention provides a technique for imparting, to a surface of a polymeric article, a desired chemical functionality that differs from the article as a whole. The technique makes use of the discovery that, in a compatible blend of different polymeric components, migration of the more highly-branched component can be enhanced by entropy. The molecule having the greatest number of chain ends can be present at the surface with the least configurational entropy penalty.

Also provided is a technique for imparting a desired chemical functionality to a surface of a polymeric article involving subjecting a blend of at least of a first and a second polymer component to phase inversion and allowing the second component to migrate, disproportionately, to the surface of the blend. The phase inversion technique can be driven completely by enthalpy, or by entropy, or a combination. That is, the above-noted technique involving allowing migration of a more highly-branched component to a surface of a blend can be combined with a phase inversion technique.

In one embodiment the invention provides an article having a surface, comprising an entangled blend of a first, relatively lower-cohesive-energy polymer component and a second, relatively higher-cohesive-energy polymer component. The first and second polymer components are compatible with each other at room temperature, that is, are miscible. The second polymer component is present at the surface of the article in a ratio to the first polymer that is greater than the overall ratio in the article of the second polymer component to the first polymer component.

In another embodiment the invention provides an article, having a surface, comprising an entangled blend of a first, essentially hydrophobic polymer component and a second polymer component that is a random co-polymer entangled with the first polymer component. The second polymer component is more hydrophilic than the first polymer component. The second polymer component has a molecular weight of at least about 15,000 and is present at the surface of the article in a ratio to the first polymer component that is greater than the overall ratio in the article of the second polymer component to the first polymer component. The second polymer component can be a random co-polymer.

Also provided is an article having a surface, comprising an entangled blend of a first polymer having an affinity to water and a second polymer having an affinity to water. The first and second polymers are compatible at room temperature. The surface of the article has an affinity to water that is greater than the average water affinity of the total of the first and second polymers in the article.

All of the articles of the invention can be porous membranes having a desired surface chemical functionality.

In another aspect the invention provides a series of methods. In one embodiment a method involves providing a miscible blend of at least first and second polymer components each insoluble in water. The first component is essentially hydrophobic and the second component is more hydrophilic than the first component. The components are allowed to phase segregate to form a porous membrane having a core and a surface of greater hydrophilicity than the core.

In another embodiment, a method involves providing a fluid blend of a first, relatively lower-cohesive-energy polymer component and second, relatively higher-cohesive-energy polymer component that is compatible with the first polymer component at room temperature. The blend is allowed to harden to form a polymeric article having a surface. The second polymer component is present at the surface of the article in a ratio to the first polymer component that is greater than the overall ratio in the article of the second polymer component to the first polymer component.

In another embodiment, a method is provided in which a polymer membrane is fabricated having a particular surface chemical functionality. A polymeric fluid is provided that includes a blend of a first polymer component and a second polymer component that is compatible with the first polymer component at room temperature that includes a particular chemical functionality. The polymeric fluid is subjected to phase inversion and an article is recovered that includes the blend of the first and second polymers. The second polymer is present at the surface of the article in a ratio to the first polymer that is greater than the overall ratio in the article of the second polymer to the first polymer.

In another embodiment a method of making a polymer membrane is provided that involves providing a polymeric fluid including a blend of a first polymer component and a second polymer component compatible with the first polymer component at room temperature. An emulsion is formed by exposing the polymeric fluid to a fluid incompatible with the first and second components and allowing the incompatible fluid to form the emulsion in the polymeric fluid. A porous article is recovered from the mixture that includes a blend of the first and second polymers with the second polymer present at the surface of the article in a ratio to the first polymer that is greater than the overall ratio in the article of the second polymer to the first polymer.

In some embodiments the second polymer component is more branched than is the first polymer component. In all cases the second and first polymer components can have different functionalities, with the surface enhancement of the second polymer component allowing formation of a polymeric article, such as a membrane, having a desired surface chemical functionality. The first and second components can be thermodynamically compatible at room and use temperatures, in addition to being compatible as a melt, therefore a thermodynamically stable, surface-segregated article results. In one embodiment, each component has a molecular weight of at least about 5,000, and a very well-entangled combination of first and second components results in the article.

Any of the articles described herein can be acrylic, for example the above-described polymers can be acrylic polymers. One set of methods involves blending a first, essentially hydrophobic acrylic polymer with a second, more-hydrophilic acrylic polymer and allowing the more-hydrophilic polymer to be driven to the surface of the article. In another method, a fluid blend of an essentially hydrophobic acrylic polymer and a more-hydrophilic acrylic polymer is provided, the two polymers being compatible. The blend is hardened to form an article in which the more-hydrophilic acrylic polymer is present at the surface disproportionately. The same method can be carried out where the first and second acrylic polymers are not necessarily hydrophobic and more-hydrophilic, but differ in chemical functionality of another type.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure.

DETAILED DESCRIPTION OF THE INVENTION

Figure 1:
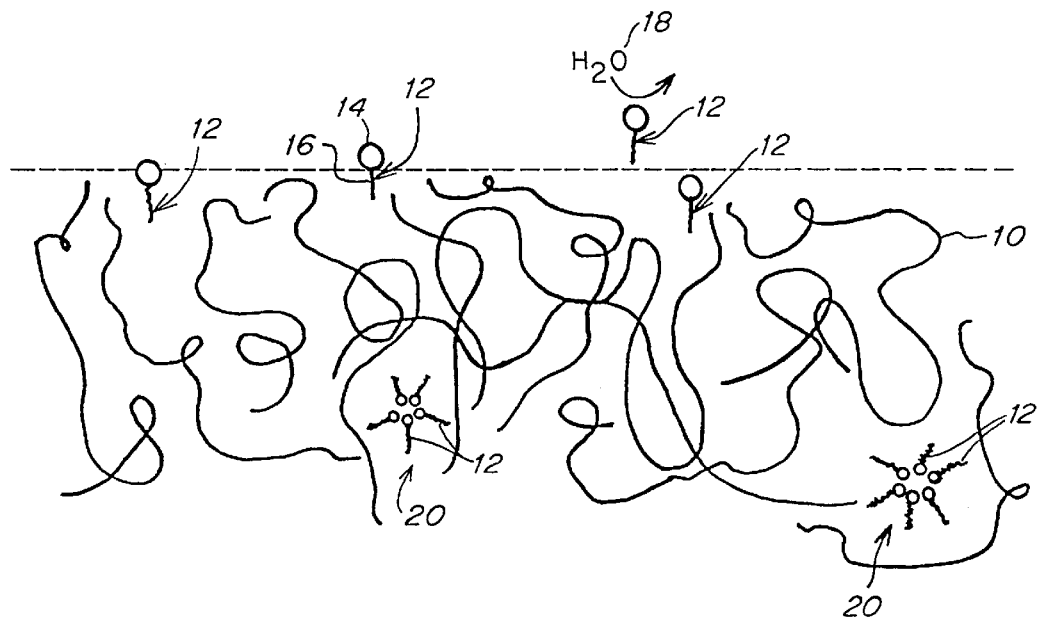
FIG. 1 is a schematic illustration of a cross section of a surface of an essentially hydrophobic, prior art polymeric article modified with a low molecular weight component having a hydrophobic portion anchored in the article and a hydrophilic portion facing the surface of the article.

U.S. Provisional Pat. Appln. Ser. No. 60/024,570, filed Aug. 26, 1996 by Mayes et al., U.S. Pat. Appln. Ser. No. 08/819,610, filed Mar. 17, 1997 by Mayes et al. and PCT Appln. No. PCT/US97/16488, filed Aug. 26, 1997, and all are incorporated herein by reference.

The present invention provides surface-modification techniques for polymeric articles that involve selective segregation of a component of a polymer blend to a surface of the blend to provide desired chemical functionality at the surface. One aspect of the invention makes use of entropic segregation to create a desired surface property. Another aspect involves segregation driven at least in part by entropy. One embodiment of the invention involves surface-functionalized membranes.

Specifically, the present invention involves techniques for surface segregation, from a polymer blend of a plurality of miscible components, of a relatively higher-cohesive-energy component including a chemical functionality that is desired at the surface. In one set of embodiments, control of the surface chemistry of a polymer can be achieved by designing a surface-modifying polymer component that will be entropically-driven to the surface of the article because of its branched molecular architecture, providing the surface-modifying component with a chemical functionality desired at the surface, and designing the component so that it will be compatible with the base component of the polymer matrix. As used herein, "entropically-driven" is meant to define driven by a force enhanced at least in part by entropy. That is, the surface-modifying polymer component is driven to the surface essentially exclusively by entropic forces, or by a combination of forces at least one of which is entropic. In particular, use of a branched molecular architecture in a component having a chemical functionality desirable at the surface provides a thermodynamic mechanism for the segregation of the component to the surface and a means to achieve a high surface coverage of the component.

In another set of embodiments, a phase inversion technique is used to enhance migration of a desired component of a miscible blend of a plurality of components to a surface. In this set of embodiments migration of a selected component to a surface can be driven by enthalpy, entropy, or a combination.

Manufacture, or surface modification, of a variety of articles can be enhanced by the techniques of the invention. For example, articles having an essentially hydrophobic core can be modified to have a hydrophilic surface which is useful for applications requiring low static-charge build-up or improved wettability to glues, paints, inks, or the like. Surfaces of articles of the invention can be modified to resist protein adsorption, providing new candidate materials for biomedical uses. Optical devices, such as intraocular lenses and the like can be enhanced, as well as membranes for water purification and other separation.

Where a branched component is entropically driven to a surface from a blend, the additive is thermodynamically favored at the surface despite higher surface tension, thus the surface does not tend to reconstruct over time, in contrast to high energy surfaces prepared on polymers by more traditional routes.

The technique of the invention results in surfaces that are essentially hydrophilic according to one set of embodiments, the surface being more hydrophilic than the bulk of the articles. "Essentially hydrophilic", as used herein, means that the contact angle formed with water at the surface is less than about 70°, preferably less than about 65°, and more preferably still 59°–62°. In another embodiment the articles are essentially hydrophilic when the articles, upon exposure to water, develop a water content of at least 15% within the first 50 Å of the surface, preferably at least 20%, more preferably at least 25%, and more preferably still at least 30%. These values of percent water at the surface can also extend to within at least 100 Å from the surface.

The invention provides selective surface segregation of a component of a blend where both the surface and bulk of the article can comprise the polymer component that is found disproportionately at the surface. In this embodiment, both the surface and the bulk each comprise a first polymer component and a second polymer component where a higher ratio of the second component to the first component is present in the surface than in the bulk. Thus, both polymer components are present in significant quantities throughout the entire article. An advantageous feature of this arrangement is that the article can function as a self-healing article, i.e., upon loss of the surface-segregated component from the surface via, e.g., normal wear, a sufficient amount of that component can migrate from the bulk of the article to restore the surface to a desired state. This self-healing segregation takes place at room temperature in many arrangements or, if desired, an article can be heated to render it slightly fluent to aid segregation.

In one embodiment, the second, surface segregated component is more hydrophilic than the first component, and the article is self-healing with respect to hydrophilicity at the surface. A self-healing hydrophilic membrane is one example.

In one embodiment, the invention provides a polymer matrix base component defined by a first, essentially hydrophobic acrylate polymer that is not highly branched, and preferably is linear. A second, more-hydrophilic acrylate polymer having non-linear architecture, preferably a branched architecture, is added. The non-linear component preferably is a random copolymer comprised of two or more acrylate or methacrylate species, at least one of which features a hydrophilic side chain that imparts hydrophilicity to the copolymer. The side chain can be essentially any hydrophilic moiety, preferably a polyalkylene oxide such as polyethylene glycol. The side chain should be sufficiently short to inhibit crystallinity (see Sakellariou, Polymer, 34, 3408 (1993)). The second polymer should also be insoluble in water and compatible with the matrix base component. The second polymer also should have a molecular weight large enough that it remains entangled with the matrix base component. As used herein, the term "entangled" means that portions of polymer chains of separate, non-crystalline components wrap about each other, creating physical barriers to motion. The term is well-known to those of ordinary skill in the art. Generally, this means that the second polymer should have a molecular weight of at least about 5,000, preferably at least about 10,000, more preferably at least about 15,000, and more preferably still at least about 20,000. The higher molecular weight of the additive of the invention facilitates greater entanglement because of longer chain length.

The second polymer also should, as noted, be compatible with the matrix base component. As used herein, "compatible" means that the additive does not phase separate from the matrix base component. For example, the additive does not phase separate because of inter-component repulsion due to differences in energy of the components, such as hydrophobic-hydrophilic repulsion, which has been exploited in the prior art for providing surface-segregated polymers. While several prior art arrangements involve an additive that is miscible with a matrix base component at melt temperatures, the additive and matrix base component typically are not compatible at room temperature and this property is used to cause the additive to migrate to the surface upon cooling and hardening of a melted blend. In contrast, in the present invention the matrix base component and additive not only are miscible to form a homogeneous solution as a melt but, upon cooling and hardening, the additive and matrix base component are compatible and remain well-entangled rather than separating into distinct phases. One advantage of a well-entangled article rather than a phase-separated article is that phase separation can lead to delamination and other mechanical failures.

In some embodiments, in which materials remain amorphous, one advantageous characteristic of this room-temperature, solid-phase compatibility is that a blend of the invention typically will remain clear when solidified, rather than running the danger of becoming opaque when solidified due to phase separation or to the formation of micelles resulting from phase incompatibility. These embodiments are particularly suited for use with devices and articles that must remain optically clear, such as intraocular lenses. That is, components of the present invention, in certain embodiments, are selected not to crystallize, and this lack of crystallization provides clarity, rather than opacity, to articles of the invention. Those of ordinary skill in the art, with reference to standard polymer handbooks and texts such as Young, et al., "Introduction to Polymers" (Second Edition), Chapman & Hall, London (1991) and Stevens, "Polymer Chemistry—An Introduction" can select a matrix base component and additive, neither of which will crystallize. Lack of crystallization in the additive of the invention can be facilitated according to these embodiments by providing the additive in random copolymer form, for example, synthesized via anionic or free radical polymerization. Additionally, in general acrylates do not crystallize.

Thus, one simple screening test to determine suitable matrix base component/additive combinations for use in accordance with non-crystalline embodiments of the invention involves blending a matrix base component with an additive, allowing the blend to harden, and observing optical properties of the resulting article. Where the resulting article is clear, rather than opaque, the matrix base component and additive are good candidates for use in this embodiment. Prior to a screening test to determine optical clarity of a blend of candidate components, those of ordinary skill in the art can select components that are good candidates for miscibility by considering cohesive energy density which can be calculated through group contribution methods. Two components that differ drastically in cohesive energy density may not be miscible.

FIG. 1 illustrates schematically, in cross section, one essentially hydrophilic prior art polymeric article designed to have a hydrophobic surface. Although FIG. 1 is representative of certain known prior art systems, the applicants are not aware of membranes prepared in this way in the prior art. The article includes a polymeric matrix base component 12 which, as illustrated, is a long-chain, linear, hydrophobic polymer, and an additive 12 designed to impart hydrophilicity to the surface of the article. In the figure, the dotted line is representative of the surface of the article. Of course, the surface is defined by the boundary of polymer molecules of which the article is comprised.

Additive 12 is a relatively low-molecular weight component, typically in a molecular weight range of from about 500 to about 5000, and includes a hydrophilic portion 14 at a first end and a hydrophobic portion 16 at a second end. This can be achieved by synthesizing an A-B block copolymer in which segment A is hydrophilic and segment B is hydrophobic.

Such an article is fabricated typically by blending component 12 with additive 12 in a melt (in which condition component 12 and additive 12 may be miscible) and allowing the blend to cool and harden. Additive 12 typically is incompatible with base component 12 at room temperature and, when the blend cools and hardens, it segregates to the surface. Segregation of additive 12 to the surface of the article, driven by enthalpy, is facilitated by the low molecular weight of additive 12. Additive 12 can remain anchored to some extent in the article because its hydrophobic portion 16 is compatible with the hydrophobic polymeric matrix base component 10.

While hydrophilic portion 14 creates some degree of hydrophilicity at the surface of the article, the overall incompatibility of additive 12 with polymer matrix base component 12 can render the overall arrangement thermodynamically unstable. Additionally, in the article of FIG. 1, because additive 12 can have one or more of the characteristics of water-solubility, low molecular weight, lack of entanglement with base component 10, and incompatibility with base component 10, component 12 can be scavenged from the polymeric article and dissolved in water to which the article is brought into contact. This is illustrated schematically in FIG. 1 by removal of one of components 12 by water molecule 18.

Another disadvantage in the incompatibility of components 10 and 12 of the prior art article of FIG. 1 is that micelles 20, formed of a plurality of additives 12 with their hydrophobic portions facing outward, can form. Such micelles can render the material opaque, and can compromise mechanical properties.

Not shown is a prior art polymeric article in which crystallization of the base polymeric component is the primary driving force behind segregation of a surface-modifying additive to the surface of the article. For example, with reference to FIG. 1, if matrix base component 12 was a polymer forming regions of crystallinity and additive 12 was selected to be chemically compatible with individual units of matrix base component 12 but incompatible with crystallinity, the blend could be formed and annealed to form regions of crystallinity driving additive 12 to the surface. However, this type of arrangement typically relies on low-molecular-weight, highly mobile additives which therefore are not well entangled with the base component, and surface segregation relies upon the phase incompatibility of the additive with the base component.

Figure 2:
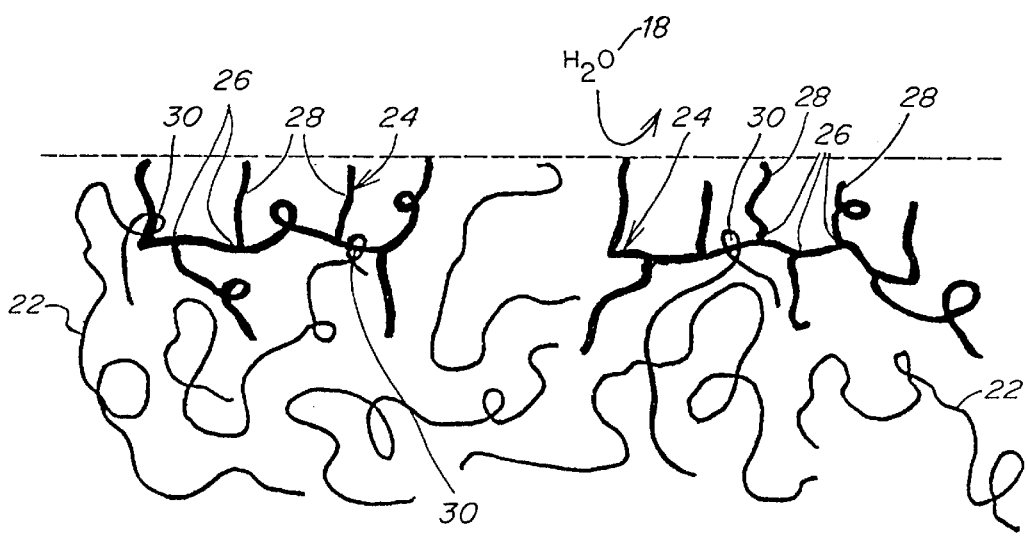
FIG. 2 is a schematic illustration of an essentially hydrophobic polymeric article of the invention having a compatible, less-hydrophobic, branched component residing at the surface of the article and entangled with the polymer chains of the article.

Referring now to FIG. 2, a polymeric article of the present invention is illustrated schematically. Like the article of FIG. 1, the article of FIG. 2 includes a matrix base component 22 that is a first long-chain polymer that is essentially hydrophobic in one set of embodiments. The article of the invention includes an additive 24 that is a second, branched polymer including branch points 26 and relatively short side chains 28 emanating from branch points 26, which have a surface-modifying characteristic such as a hydrophilic characteristic. As discussed, surface-modifying side groups such as hydrophilic side groups can be provided by random copolymerization of units including the surface-modifying side chain and units that do not include the hydrophilic side chain.

Second polymer component 24 is of relatively high molecular weight and is compatible with first, base component 22 and, therefore, component 22 and component 24 are entangled, as illustrated schematically at entanglement locations 30. This entanglement, which can be due to one or more of compatibility, non-crystallinity, and threshold molecular weight, secures component 24 in the article and water molecule 18, brought into contact with the surface of the article, does not dislodge the additive where the additive is hydrophilic (where the additive has a different chemical functionality, exposure of the article to a solvent attracted to that functionality will not dislodge the additive). Second polymer component 24 typically is insoluble in water, due to backbone polymer insolubility, rendering the component more securely anchored to the surface of the article.

Migration of the second component 24 to the surface, where the second component is hydrophilic is surprising since, as the higher surface tension (higher-cohesive-energy) component, those of ordinary skill in the art would expect, due to enthalpic considerations, that the second component would be favored to remain away from the surface in the bulk of the polymer, while the first, lower-cohesive-energy matrix base component 22 would be found predominantly at the surface (see Example 1, below).

Although FIG. 2 illustrates a second polymeric component 24 that is highly branched and a first, matrix base component 22 that is entirely linear, this is for purposes of clarity only, illustrating a preferred embodiment of the invention. A branched second component and first, linear matrix base component will satisfy selection criteria of the invention, in which the second component and matrix base component are selected in conjunction with each other such that the second component is entropically favored at the surface of an article made of these components. This involves selecting a second component 24 having more chain ends than the first, matrix base component 22, since a surface of an article introduces a reflecting boundary condition on a random walk that characterizes spatial distribution of the polymer chain, which lowers the number of total configurations available to a chain, and hence the entropy of the system. To minimize the number of reflections required at the material boundary, chain ends preferentially segregate to the surface of a polymer melt, in the absence of strong interactions.

Figure 3:
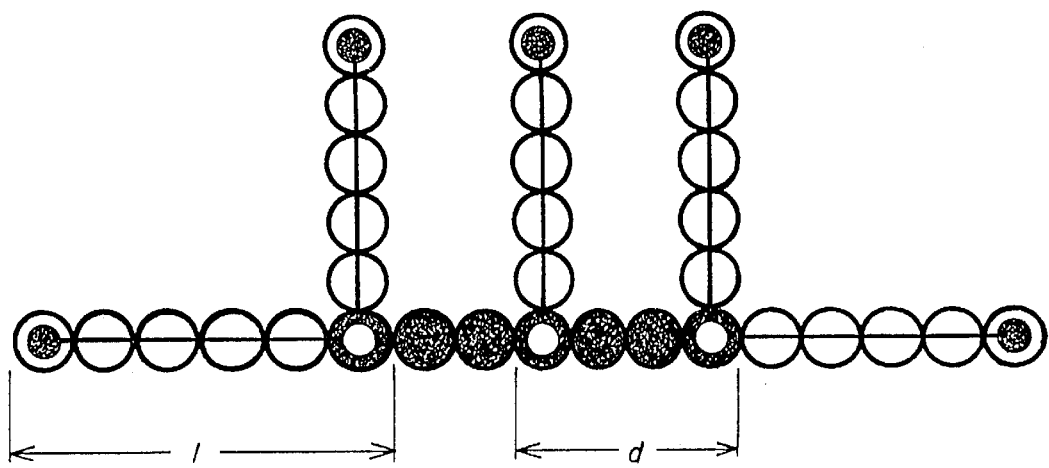
FIG. 3 illustrates schematically a branched component of the invention.

Accordingly, second component 24 includes more chain ends than does matrix base component 22. The number of chain ends of each can vary widely, especially in the case of the second component, so long as there is a difference in number of chain ends that causes the second component to surface segregate. Architecture of the components of the invention will be discussed with reference to FIG. 3, showing a branched species in which circles represent units such as mer units or atoms (e.g. carbon atoms). The species of Scheme 1 includes 5 branches, each of length l=6, and 2 branch connections, each of length d=4. For clarity, branch segments and branch-connection segments are depicted as white- and black-filled circles, respectively. Chain ends are shown as white circles with black dots, and branch points are shown as black circles with white dots.

The branches represent side groups on a polymer chain over and above those that exist inherently on the polymer backbone. For example, where the matrix base component and the second component are both methylmethacrylates, the -COOMe side group of each mer is not considered a branch.

The matrix base component 22 of the invention should be linear or, if branched, should include no more than about 4 units per branch, and less branching than the additive. For example, the matrix base component can be polybutylmethacrylate.

The second component 24 should include branches that are not long enough to form regions of crystallinity at use temperatures if selected of material that can crystallize, in embodiments where crystallinity is not desired. Generally, the branches should be of length no longer than about l=25 segments, preferably no longer than about l=20 segments, more preferably no longer than about l=15 segments. Where the second component is a random copolymer, of course, the spacing d between branches varies. Therefore, the second component is best described as one having at least about 4% branched segments in the backbone (5% of the chain units along the backbone are branch points as illustrated in FIG. 3), preferably at least about 7%, more preferably at least about 12%, more preferably at least about 15%, and more preferably still at least about 18%. Where branches are hydrophilic, the percent of branched segments is preferably less than an amount that renders the additive water-soluble. In a different embodiment in which the branches are of a chemical functionality that is attracted to a surrounding environment (such as a hydrophobic functionality when used in the presence of a hydrophobic solvent), the branches preferably are less than amount that renders the second component soluble in the hydrophobic solvent.

In one embodiment, the invention involves a first, acrylate matrix base component 22 and second acrylate component 24. That is, the matrix base component 22 and second component each are the polymerization product of one or more monomers having the formula $CH_2=C(R_1)(COOR_2)$, where $R_1$ and $R_2$ are each selected from the group consisting of hydrogen, hydrocarbon groups, and alcohol groups and $R_1$ and $R_2$ can be the same or different. Hydrocarbon groups such as hydrogen, alkyl, alkenyl, alkynyl, cycloalkyl, aryl, alkaryl, aralkyl, and the like may be selected. As used herein, the terms "hydrocarbon", "alkyl", "cycloalkyl" and similar hydrocarbon terminology is meant to include alcohols and hydrogen, although specific reference to the inclusion of hydrogen and/or alcohols is frequently made herein. Examples of such groups are methyl, propenyl, ethynyl, cyclohexyl, phenyl, tolyl, benzyl, hydroxyethyl and the like. $R_1$ is preferably selected from groups including hydrogen and the general class of lower alkyl compounds such as methyl, ethyl, or the like.

$R_2$ can be an alkyl group, preferably having 1 to 24 carbon atoms, most preferably 1 to 18 carbon atoms; an alkenyl group, preferably having 2 to 4 carbon atoms; an aminoalkyl group, preferably having 1 to 8 carbon atoms, and optionally substituted on the nitrogen atom with one or, preferably two alkyl groups, preferably having 1 to 4 carbon atoms; an alkyl group, preferably having 1 to 4 carbon atoms, having a five or six-membered heterocyclic ring as a substituent; an allyloxyalkyl group, preferably having up to 12 carbon atoms; an alkoxyalkyl group, preferably having a total of 2 to 12 carbon atoms; an aryloxyalkyl group, preferably having 7 to 12 carbon atoms; an aralkyl group, preferably having up to 10 carbon atoms; or a similar alkyl or aralkyl group having substituents which will not interfere with the polymerization of the ester. That is, the matrix base component and additive, so long as each is selected according to other criteria described, can include esters selected from the group consisting of $(C_1-C_{24})$alkyl esters of acrylic acid, preferably a $(C_1-C_4)$alkyl acrylate, di$(C_1-C_4)$alkylamino $(C_2-C_4)$alkyl esters of acrylic acid, $(C_1-C_8)$alkoxyalkyl esters of acrylic acid, $(C_6-C_{10})$aryloxyalkyl esters of acrylic acid, $(C_7-C_{10})$aralkoxyalkyl esters of acrylic acid, and $(C_7-C_{10})$aralkyl esters of acrylic acid. Copolymers can include polymers in which more than one monomer is selected from a given group, for instance, the case where the polymer is a copolymer of at least two $(C_1-C_{24})$alkyl acrylates. Other copolymers of the invention comprise monomers which may or may not be acrylates, such as copolymers of at least one $(C_1-C_{24})$alkyl acrylate and at least one other copolymerizable ethylenically-unsaturated monomer. This copolymerizable monomer may be acrylonitrile or dimethylaminoethyl acrylate, preferably when the alkyl acrylate is a $(C_1-C_4)$alkyl acrylate.

Among the esters embraced by the formula $CH_2=C(R_1)(COOR_2)$ which are suitable monomers are unsubstituted alkyl acrylates, in which the alkyl group can have branched or straight-chain, cyclic or acyclic spatial configurations, such as methyl acrylate, ethyl acrylate, propyl, isopropyl and cyclopropyl acrylates, isobutyl, t-butyl, n-butyl and cyclobutyl acrylates, pentyl and cyclopentyl acrylates, hexyl and cyclohexyl acrylates, heptyl and cycloheptyl acrylates, octyl, acrylates, including 2-ethylhexyl acrylate, nonyl acrylates, decyl acrylates, undecyl acrylates, lauryl acrylates, myristyl acrylates, cetyl acrylates, stearyl acrylates, and the like; aralkyl acrylates, such as phenylethyl acrylates, phenylpropyl acrylates, and the like; aralkyl acrylates, in which the aryl group is substituted with alkyl groups, halogen atoms, alkoxy groups, nitro groups, or similar substituents which will not interfere with the polymerization reaction; alkenyl acrylates, such as allyl acrylate, and the like; aminoalkyl acrylates, such as dimethylaminoethyl acrylate, phenylaminoethyl acrylates, t-butylaminoethyl acrylates, dimethylaminobutyl acrylates, diethylaminoethyl acrylate, and the like; alkyl acrylates having a heterocyclic group as a substituent on the alkyl group, such as morpholinoalkyl acrylates, oxazolidinylalkyl acrylates, piperidinodalkyl acrylates, dioxolanylalkyl acrylates, i.e., ketals and acetals of glyceryl acrylate, and the like; iminoalkyl acrylates, such as ketiminoalkyl acrylates and aldiminoalkyl acrylates; alkoxyalkyl, aryloxyalkyl, and aralkoxyalkyl acrylates, such as methoxyethyl acrylate, ethoxyethyl acrylate, butoxyethyl acrylates, hexyloxypropyl acrylates, ethoxypropyl acrylates, propoxybutyl acrylates, hexloxyhexyl acrylates, phenoxyethyl acrylates, benzyloxyethyl acrylates, and the like; and allyloxyalkyl acrylates, such as allyloxyethyl acrylate, allyloxyethoxyethyl acrylate, allyloxypropyl acrylate, and the like. Bis acrylate esters of diols, such as the diester of 1,4-butanediol and acrylic acid, can also be used. Other esters of acrylic acid which do not contain substituents which would interfere with the polymerization of these esters are also suitable. Methacrylates of the above acrylates also are suitable.

The matrix base component can be the polymerization product of a monomer having the formula $CH_2=C(R_1)(COOR_2)$, where $R_1$ is H or $CH_3$, and $R_2$ is H or C1–C8 alkyl. The matrix base component can be a random copolymer of a species such as this with a species in which $R_2$ is larger but, as discussed above, preferably with no more than about 4 additional units in $R_2$.

Although the matrix base component is exemplified, in the discussion above, as an acrylate, this is for purposes of illustration only and any of a wide variety of base components can be used, so long as the first, base polymeric component and the second polymeric component meet the criteria set forth herein. For example, the matrix base component can be a fluorinated polymer such as polyvinylidene fluoride (PVDF), or other polymer components such as those described below in connection with phase inversion techniques. In connection with the description above, the most important consideration is architecture of the specific polymer components.

The second component of the invention, in a preferred embodiment, is as described above for the matrix component and, in addition, includes hydrophilic branches via incorporation of a monomer in copolymerization where $R_2$ is hydrophilic, such as a polyalkylene oxide. As noted above, the second component should be of molecular weight sufficient to be well-entangled with the matrix base component, and added side chains should be selected to impart to the second component a different chemical functionality than that of the base component and in particular a chemical functionality desired at the surface. In one, preferred embodiment, the second component is made by a copolymerization reaction including a monomer that constitutes the monomer of the matrix base component and a monomer in which $R_2$ is a polyethylene glycol. Specific examples of monomers suitable for polymerization to form a copolymer composition according to this embodiment of the present invention include, but are not limited to: acrylonitrile, 2-ethylhexylmethacrylate, methylmethacrylate, dodecylmethacrylate, vinylacetate, cyclohexylmethacrylate, 2-hydroxypropylmethacrylate, and acrylamide.

Acrylates are advantageous in that they can be synthesized economically. For example, free radical polymerization or anionic polymerization of a random copolymer additive from acrylates including an acrylate macromonomer having a side chain with a desired chemical functionality results in a random, branched copolymer having characteristics of the chemical functionality of the side chain to an extent related to the relative amount of the acrylate monomer including the side chain.

A random copolymer can be advantageous since a block copolymer that includes hydrophilic blocks and hydrophobic blocks can be water soluble in that it can form a micelle-like structure in which blocks of hydrophilic polymer units segregate to the exterior of the micelle, while an analogous random copolymer will not form micelles and therefore may not be water soluble.

The technique of the invention involving allowing a particular component of a miscible polymer blend to segregate to the surface can be applied to injection molding polymer processes. For example, intraocular lenses, other optical devices, and essentially any polymeric article can be injection molded using a miscible blend of a plurality of components at a temperature at which one component can be preferentially-driven to the surface. In injection molding, or other techniques, a polymer blend can be fabricated and allowed to harden under conditions at which entropically-driven segregation does not occur, or occurs only to a limited extent, but the article can be further heated for a period of time and at a temperature sufficient to allow further segregation to take place.

In another aspect of the invention a surface of an article is modified to expose a desired chemical functionality by delivering to the surface, in a solvent in which the article is at least partially soluble, a surface-functionalizing branched polymer that can entangle with molecules of the article. The solvent dissolves a thin layer of molecules at the surface and, after delivery of the modifying branched polymer, entanglement occurs, followed by evaporation of the solvent. One set of articles that can be created in accordance with the invention are surface-functionalized intraocular lenses. Intraocular lenses are surgically inserted into a patient's eye to replace a clouded or otherwise damaged lens. These lenses typically are made of synthetic polymeric materials and, desirably, would have a physiologically-compatible surface coating. The lenses can be made from PMMA, which can be lathed from a PMMA rod. In accordance with one aspect of the invention, the surface of a PMMA intraocular lens can be coated with a PMMA P(MMA-r-MnG) blend in a solvent highly compatible with the lens, such as tetrahydrofuran (THF), which solvent evaporates to leave a hydrophilic coating. The technique results in a compatiblized coating. In another technique a PMMA lens can be coated with the P(MMA-r-MnG) alone in THF. In either case, the solvent solubilizes a thin film of polymer at the surface of the article, resulting in entanglement of PMMA in the lens itself with PMMA in the additive that is entangled with P(MMA-r-MnG) and/or the P(MMA-r-MnG) itself, or with P(MMA-r-MnG) alone where the additive is solely P(MMA-r-MnG). Thus, according to one embodiment the invention involves an optical device, such as an intraocular lens, surface functionalized as described by the coating method above.

Although rendering a hydrophobic bulk polymer blend hydrophilic is discussed predominantly above, the invention allows for tailoring the surface characteristic of a polymer article in a wide variety of ways. For example a second, branched component that resides at the surface of an article formed from a blend can include polyion side chains made rigid by electrostatic repulsion localized at a surface of the article. Where the article is a membrane, this creates a technique for tuning the pore size of the membrane by varying water pH levels. For example, benzyl glutamate NCA can define an exposed functionality of a branched component in a membrane created in accordance with the invention, creating a membrane with tuneable pores. Ito, et al., *J. Am. Chem. Soc.*, 119, 1619–1623 (1997), incorporated herein by reference, describes graft polymerization of such a species onto a membrane after the membrane is formed. Mika, et al., *Journal of Membrane Science*, 108, 37–56 (1995) also is incorporated herein by reference for the disclosure of ion-selectivity in membranes. Mika, et al. use graft polymerization. In connection with the present invention this functionality is provided on a branched second component that segregates from a blend of the first, bulk material and the second component. An ion-exchange membrane also can be created by providing a branched component, as a second component, including a chelating functionality as described by Kojima, et al., *Journal of Membrane Science*, 49–54 (1995), incorporated herein by reference. Bidentate, tridentate, and quadradentate chelating agents can be used, for example.

Functionalization of a branched component that resides preferentially at the surface of polymeric articles in accordance with the invention can be modified once the article is made when the branched component includes a modifiable functionality. For example, with reference to Example 2, below, MnG could be substituted with PEG methacrylate which can be used in free-radical copolymerization with MMA resulting in a branched component having functionalizable terminal groups, such as -OH at terminal ends of the branches. This allows post-segregation functionalization easily in a variety of ways. This aspect of the invention can be used in combination with any other aspect of the invention. That is, for example, an article of the invention can include a first polymer and a second polymer that is compatible with the first polymer, and is more highly-branched than the first polymer, and includes readily-functionalizable groups such as -OH groups at the ends of branches, and is allowed to migrate disproportionately to the surface of the article.

The particular type of polymerization used to form components of the invention is not strictly important. In one embodiment anionic polymerization is used, and in another set of embodiments free-radical polymerization is used. In yet another set of embodiments cationic polymerization is used.

As noted above, the invention also provides techniques for membrane fabrication where the membrane includes desired surface characteristics. A dense layer of relatively short chains can be provided at the surface of an article which can allow for a high degree of tailoring of surface characteristics, such as fouling resistance, which can be provided with hydrophilic branching. In membranes, control of pore structure can be provided by providing branches that will straighten or coil depending upon the pH of the environment. Where many branches exist at the surface the chain ends can be functionalized, as described above, where the chains terminate in a linking functionality such as -OH. Chelating agents can be provided at the surface of membranes to selectively absorb metals or other species. Other surface characteristics can be selected.

Another aspect of the present invention is a technique involving subjecting a blend of the first polymer component and second polymer component, described above, to phase inversion. In one embodiment the blend is first provided as a polymeric fluid, typically including the blend dissolved in a solvent such as dimethyl formarnide (DMF), and then exposing the polymeric fluid to a second, incompatible fluid (nonsolvent; such as water) to form an emulsion. The second, incompatible fluid forms a porous structure in the polymeric fluid, and from the emulsion is recovered a porous article. Any of a variety of articles, including membranes, can be fabricated in this manner. In the article, the second polymer is present at the surface in a ratio greater than the overall ratio of the second polymer to the first polymer. In accordance with the invention membranes can be formed having very small pores, thus reverse osmosis membranes, ultrafiltration membranes, and the like can be made. The invention includes membranes, which can be formed according to methods of the invention, having pores smaller than 10 microns in diameter, more commonly smaller than 1 micron in diameter, more commonly smaller than 0.5 microns in diameter, and can include membranes having pores on the order of 0.1 micron diameter average pore size. Membranes can be formed having pores of even smaller size, for example as small as 10 Angstroms. These values can define maximum pore sizes of membranes of the invention, average pore sizes of membranes of the invention, or a combination. That is, in one embodiment the invention includes a membrane having average pore size of less than 0.1 micron and maximum pore size of less than 0.2 micron, etc. Various combinations are possible.

The phase inversion technique can be used to fabricate a variety of articles, from a variety of different polymer blends. All that is required is that at least two miscible, polymer components be mixed and allowed to undergo phase inversion segregation. The segregation can be entropically-driven, enthalpically-driven, or a combination. For example, blends of PVDF with P(MMA-r-MnG), blends of PVDF with polyethyleneimine branched (polyion) components, blends of PVDF with a branched component having poly(acrylic acid) side chains (see Example 13, below), or a blend of a polysulfone base with a second, miscible component such as a branched additive can be used.

A simple, initial screening test can be carried out to determine whether miscible blends might be suitable for phase inversion in accordance with the invention. In one test blends are first determined to be miscible, and then the blends are provided as a viscous fluid in a minimum amount of solvent. A non-solvent (precipitating incompatible fluids such as water) is used to test the phase inversion potential of the fluid blend. In a multi-well laboratory plate, a series of polymer blends are provided in the bottoms of wells, and a non-solvent is gently added on top of each blend. Alternatively, a non-solvent can be provided in the bottom of each well and the viscous polymer blends can be provided gently atop the non-solvent. After evaporation of the non-solvent and the solvent carrier in which the blend is provided, a film of polymer blend exists. Contact angle measurements of the surface of the film, against which the non-solvent had been placed, can indicate whether segregation has taken place. That is, the contact angle at the surface in contact with the non-solvent can be measured and compared with the contact angle of a similar, homogeneous blend, which can be prepared by spin coating. If the contact angle is different, surface segregation likely has occurred and the particular blend is a good candidate for surface modification via phase inversion. Alternatively, XPS can be used to characterize surfaces of the films.

As noted, one set of articles that can be created in accordance with the invention are membranes formed by phase inversion. Polymer membranes for water treatment can be formed by phase inversion and the resulting membranes are categorized according to their pore sizes. Reverse osmosis membranes used for water desalination typically contain pores of about 5–20 Å in diameter. Colloids and macromolecules are separated from water using ultrafiltration membranes typically having pore sizes from about 10 to about 1,000 Å. Reverse osmosis and ultrafiltration membranes are prepared essentially exclusively by phase inversion processes (see, for example, Loeb, et al., *Advan. Chem. Ser.*, 38, 117, 1962; Kesting, et al., *Synthetic Polymeric Membranes*, New York: McGraw-Hill Book Company, 1971, pages 116–157; Strathmann, et al., "A Rationale for the Preparation of Loeb-Sourirajan-Type Cellulose Acetate Membranes", *J. Appl. Poly. Chem.*, 15, 811–28, 1971; Strathmann, et al., "The Formation Mechanism of Phase Inversion Membranes", *Desalination*, 21, 241–55, 1977; Strathmann, et al., "The Formation Mechanism of Asymmetric Membranes", *Desalination*, 16, 179–203, 1975). Membranes produced using this process typically have an asymmetric porous structure consisting of a dense, 0.1 to 1 micron surface layer overlaying a highly porous, 100 to 200 micron sublayer (Strathmann, in *Synthetic Membranes: Science Engineering and Applications*, Bungay, P. M., et al., eds. Dordrecht, The Netherlands: Kluwer Academic Publishers, 1983, page 1). The separation characteristics of the membrane are determined by the pore size distribution in the surface, or "active" layer. The porous sublayer provides mechanical support.

Apparatus for the continuous fabrication of polymer membranes by phase inversion is known. The steps, in general, involve dissolving a polymer in a solvent to form a solution containing from about 10 to about 30 weight percent polymer. Small quantities of nonsolvent and organic or inorganic salts are sometimes, but not always, added to the solution. The solution then is cast under a doctor blade onto a moving, nonwoven polyester or Mylar™ belt. Often, this belt will serve as a permanent support for the finished membrane. The thickness of the cast film is typically between 100 and 500 microns. Partial evaporation of the solvent may or may not be allowed to occur. The film then is immersed in a nonsolvent, that is, a fluid that is incompatible with the polymer (usually water) resulting in gelation of the polymer to form an asymmetric, porous structure. The nonsolvent temperature is typically between about −10 and about 20° C. The membrane can be heat treated in a second water bath to promote pore shrinkage. The heat treatment temperature is usually between about 50 and about 90° C. The membrane then is rinsed and taken up on a roll.

Several mechanistic theories of polymer membrane formation exist in the literature. A particular comprehensive theory is that presented by Strathmann, et al., (*Desalination*, 21, 241–55; *Desalination*, 16, 179–203, both referenced above). According to this theory, the formation of the initial membrane morphology during the coagulation step in the membrane fabrication process is fundamentally a phase separation process. An initially homogeneous casting solution becomes unstable as nonsolvent is imbibed from the gelation bath. When the local concentration of nonsolvent exceeds a critical value, the homogeneous casting solution separates into a polymer-rich phase and a polymer-poor phase, the polymer-poor phase eventually becoming the fluid-filled pores of the membrane.

The function and advantage of these and other embodiments of the present invention will be more fully understood from the examples below. The following examples are intended to illustrate the benefits of the present invention, but do not exemplify the full scope of the invention.

EXAMPLE 1 (Comparative)

Synthesis and Characterization of PEO/PMMA Polymeric Article

PEO/PMMA blends were made, specifically, 50,100 g/mol PEO in 222,000 g/mol PMMA-$d_8$, with 2, 5, 10, and 20% by weight of PEO. The samples were annealed at 190° C. for two weeks. Following this treatment, it was shown via neutron reflectivity (NR) data that the surface of each sample was substantially depleted of PEO within approximately 50 Å from each surface. This shows that the samples of Sakellariou, et al. (referenced above) were not fully annealed, and that the lower-energy polymeric component will segregate to the surface when driven by enthalpic energy.

EXAMPLE 2

Synthesis of Branched, Hydrophilic Acrylate Additive

Methyl methacrylate (MMA) monomer, $CH_2C(CH_3)(CO_2CH_3)$, was purchased from Aldrich Chemical, and methoxy poly(ethylene glycol) monomethacrylate (MnG) macromonomer, $CH_2C(CH_3)[CO_2(CH_2CH_2O)_nCH_3]$, having approximately n=9 ethylene oxide units (number average molecular weight, $\overline{M_n}$~400 g/mol) per mer, was purchased from Polysciences, Inc. The branched hydrophilic additive was prepared by random copolymerization of MMA with MnG using anionic polymerization techniques. The resulting copolymer, P(MMA-r-MnG), had approximately 40 poly(ethylene oxide) (PEO) side chains statistically distributed along the 200-unit long methacrylate backbone, with molecular weight $\overline{M_n}$=40,700 and polydispersity $\overline{M_w}|\overline{M_n}$=1.26 (where w denotes weight average) as measured by a combination of gel permeation chromatography (GPC) and light scattering. Incorporating MMA into the backbone (the MMA fraction is $f$~0.5 by mass from nuclear magnetic resonance (NMR) spectroscopy) helps anchor the copolymer to the poly(methyl methacrylate) (PMMA) matrix and renders the copolymer water insoluble.

From initial contact angles with water and diidomethane, the surface tension for the random copolymer was found to be 46.0±0.9 mJ/m², higher than PMMA (43.6±1.1 mJ/m², purchased from Polysciences, Inc. with $\overline{M_n}$=330,000 g/mol and $\overline{M_w}|\overline{M_n}$=1.1) and PMMA-$d_8$ (43.9±0.9 mJ/m², purchased from Polymer Laboratories with $\overline{M_n}$=314,000 g/mol and $\overline{M_w}|\overline{M_n}$=1.06; deuteration was used for contrast in neutron scattering experiments) used in this study, but lower than pure PEO. Since the copolymer is the higher-energy component, any surface enrichment of this species when blended with PMMA is expected to have entropic rather than enthalpic origins.

EXAMPLE 3

Creation of Polymeric Article Including Entangled Blend of Compatible High-Energy Additive With Low-Energy Matrix Base Component Samples of polymeric articles including entangled blends of a compatible high-energy additive P(MMA-r-MnG) with a low-energy matrix base component (PMMA-$d_8$; deuteration was used for contrast in neutron scattering experiments) were prepared by spin coating various blend compositions from toluene onto 10 cm diameter polished silicon wafers, creating films approximately 1000 Å thick. Films were subsequently annealed in vacuo at 190° C. for 7 days to achieve equilibrium. Small angle neutron scattering (SANS) measurements were performed on a 50% blend of 314,000 g/mol PMMA-$d_8$ and 40,700 g/mol P(MMA-r-MnG) in order to directly measure their miscibility. The resultant interaction parameter was higher than the interaction parameter between PEO and PMMA-$d_8$, but lower than that between PMMA and PMMA-$d_8$, confirming that the blend is miscible.

EXAMPLE 4

Characterization of Polymeric Articles of Example 3

Figure 4:
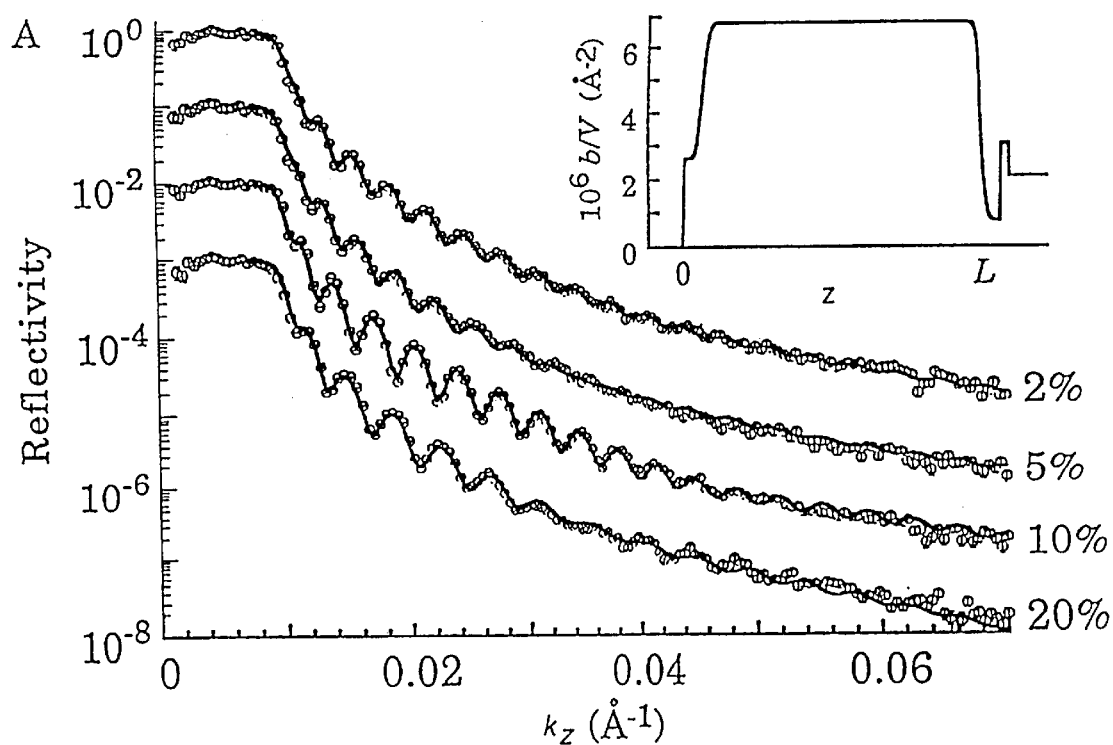
FIG. 4 shows neutron reflectivity (NR) data for blends of polymethyl methacrylate (PMMA) with a branched, hydrophilic additive prepared by random copolymerization of methyl methacrylate with methoxy polyethylene glycol methacrylate(P(MMA-r-MnG))

Neutron reflectivity (NR) was used to characterize the degree of surface segregation in the miscible blends of Example 3 (shown by cloud point measurements and SANS). FIG. 4 shows NR data (measured on a neutron reflectometer with monochromated neutrons of wavelength $\lambda$=2.35 Å) for sample films containing 2, 5, 10, and 20 wt % branched P(MMA-r-MnG) additive. NR data is shown as circles as a function of wave vector $k_z$ perpendicular to sample surfaces. Data is fit (lines) with a model scattering length density (b/V) profile (illustrated in the inset for the 20% sample) which depends on the type and amount of material present at any distance z into the sample. The inset depicts the expected configuration of the branched additive at the interfaces with the chain ends localized at the material boundary.

Figure 5:
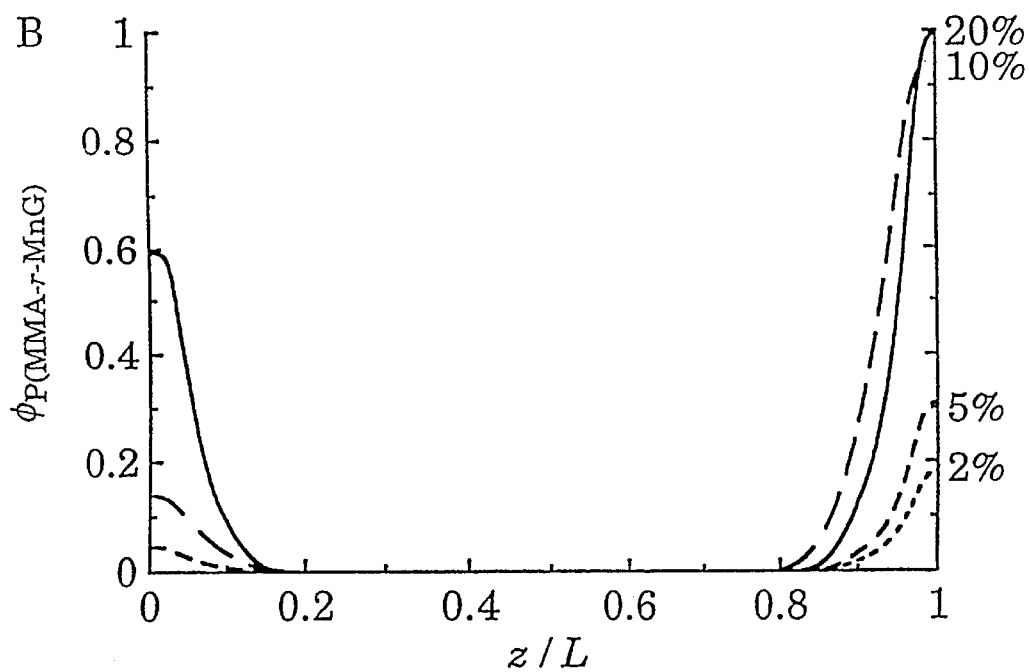
FIG. 5 shows volume fraction profiles extracted from data shown in FIG. 4.

Fits to this data yield the volume fraction profiles shown in FIG. 5. FIG. 5 provides volume fraction profiles normalized by the sample thickness, L ca. 1000 Angstroms, extracted directly from fits to the NR data, with coverage of the exposed surface of the film by the additive on the left axis and coverage of the substrate by the additive on the right axis. The film containing 20% additive shows approximately 60% coverage of the surface and 100% coverage of the substrate.

The data of FIG. 5 demonstrates the branched copolymer additive's propensity to segregate to both the surface and substrate. In all cases, complete segregation of the P(MMA-r-MnG) to the interfaces occurs.

Entropically-driven segregation of the higher-energy branched component is indicated also by the fact that the P(MMA-r-MnG) additive has a higher surface tension than PMMA-$d_8$, but slightly less than that of PMnG. Table 2 shows contact angles of various liquids (W=water, DIM=diidomethane, TP=tricresyl phosphate, respectively) on 330,000 g/mol PMMA, 314,000 g/mol PMMA-$d_8$, 19,900 g/mol PMnG, and 40,700 g/mol P(MMA-r-MnG).

TABLE 1

| | Contact Angle (°) | | |
|---|---|---|---|
| Sample | Initial | After 1 Hour | After 4 Days |
| PMMA | 70.7 ± 1.0 | 69.5 ± 1.0 | 70.0 ± 1.0 |
| P(MMA-r-MnG) | 70.8 ± 1.0 | 61.5 ± 1.0 | 61.8 ± 1.2 |
| P(MMA-r-MnG)/PMMA blend | 68.1 ± 1.9 | 65.1 ± 1.7 | 60.8 ± 1.6 |

Surface tensions calculated from the contact angle information of Table 1 for each combination of two liquids is presented in Table 2.

TABLE 2

| | Contact Angle [°] | | | |
|---|---|---|---|---|
| Liquid | PMMA | d-PMMA | PMnG | P(MMA-r-MnG) |
| W | 70.7 ± 1.0 | 70.2 ± 1.0 | — | 70.8 ± 1.0 |
| DIM | 42.8 ± 1.0 | 42.6 ± 1.2 | 35.4 ± 1.2 | 35.6 ± 1.0 |
| TP | 41.8 ± 1.0 | 42.1 ± 1.0 | 34.9 ± 1.6 | 33.5 ± 1.3 |

EXAMPLE 5

Demonstration of Hydrophilicity and Durability of Samples of Example 3

To test for hydrophilicity, advancing contact angles were measured following immersion in water for a specified time (Table 1). For PMMA the contact angle remains constant as a function of

TABLE 3

| | | Surface Tension [dyne/cm] | | | |
|---|---|---|---|---|---|
| Liquid Pair | | PMMA | d-PMMA | PMnG | P(MMA-r-MnG) |
| W | DIM | 43.9 ± 0.7 | 44.2 ± 0.7 | — | 46.1 ± 0.7 |
| W | TP | 44.3 ± 0.7 | 44.4 ± 0.7 | — | 46.2 ± 0.8 |
| DIM | TP | 42.5 ± 1.8 | 43.1 ± 1.4 | 47.0 ± 1.9 | 45.6 ± 1.2 |
| Average | | 43.6 ± 1.1 | 43.9 ± 0.9 | 47.0 ± 1.9 | 46.0 ± 0.9 | exposure time to water. The contact angle for pure P(MMA-r-MnG) initially resembles that of PMMA, but drops sharply, initially, then stabilizes about 10° lower than the initial value as the surface absorbs water. These values stabilized at about 80 minutes, remaining unchanged after four days of immersion. When fully hydrated, films with 60% surface coverage of the branched material also exhibit a contact angle roughly 10° lower than that of pure PMMA.

After drying, the contact angles for all samples return to their initial values and the measurements are repeatable demonstrating the physical stability of the surface.

EXAMPLE 6

Synthesis and Characterization of Thick Polymeric Articles

Figure 6:
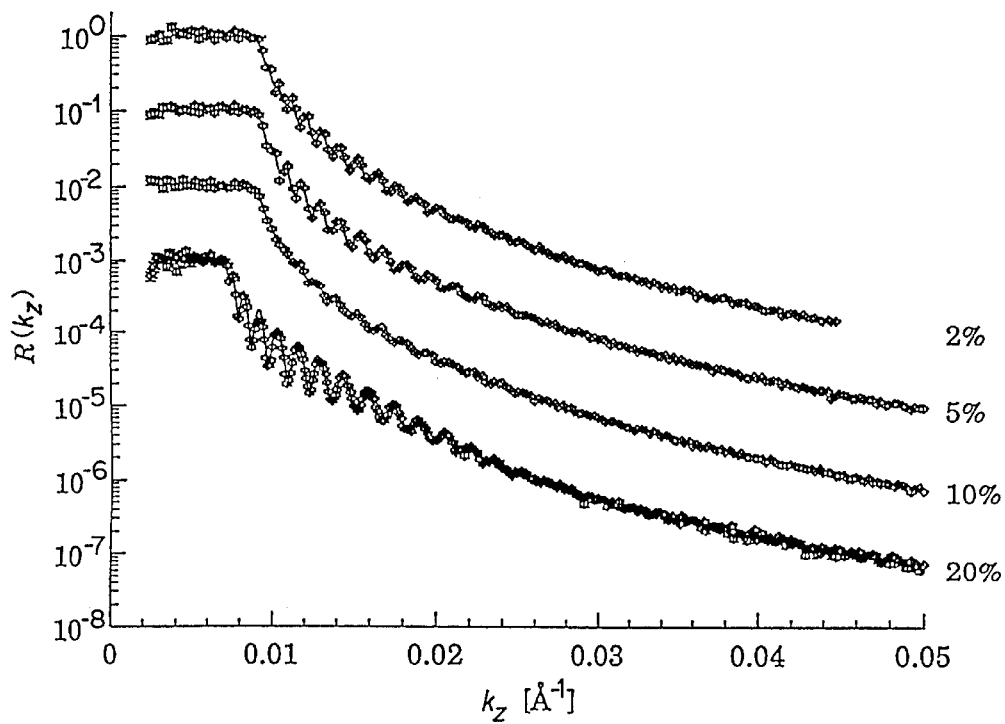
FIG. 6 shows experimental and theoretical reflectivities for thick blends of 2, 5, 10, and 20% P(MMA-r-MnG) in PMMA-$d_8$.
Figure 7:
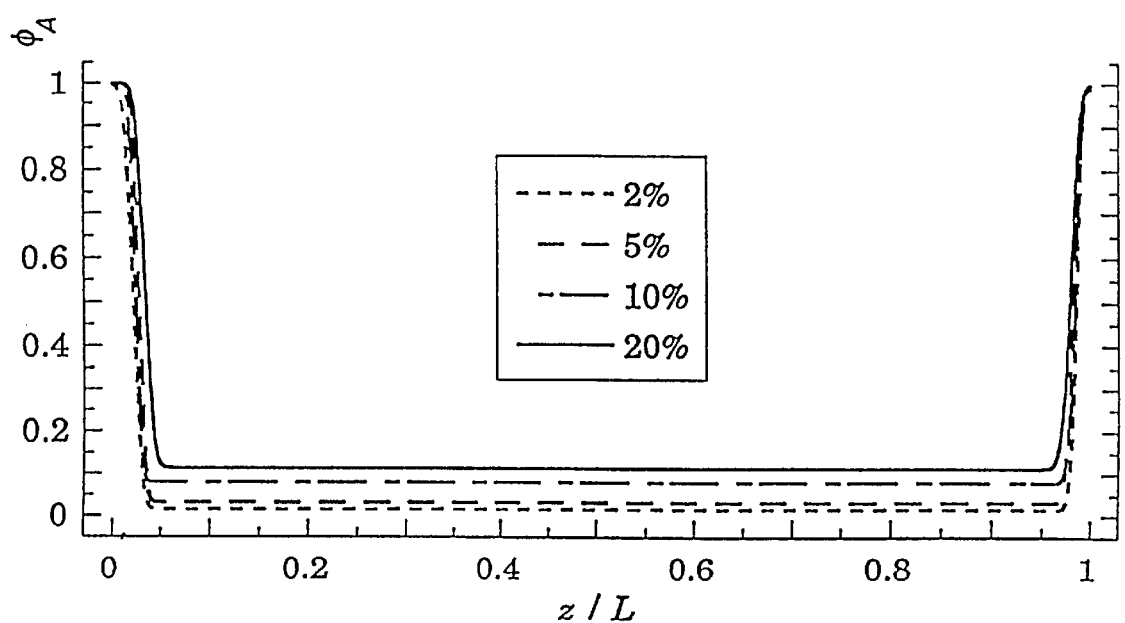
FIG. 7 shows volume fraction of P(MMA-r-MnG) in thick 2, 5, 10, and 20% blends with PMMA-$d_8$.

Polymeric articles were synthesized from blends as described in the examples above, but were spun to a final thickness of about 2,000 Å. FIG. 6 shows experimental and theoretical reflectivities for thick blends of 2, 5, 10, and 20% P(MMA-r-MnG) in PMMA-$d_8$, and FIG. 7 shows volume fractions of P(MMA-r-MnG) in these blends, showing complete coverage of both interfaces of the sample, at all blend compositions, by the more hydrophilic, branched component, without significant depletion of this component from the bulk of the article.

In these films, complete surface coverage of the branched, high-energy, random copolymer additive was observed, and surface segregation was limited to a monolayer of the additive independent of the amount of additive in the article. This demonstrates that the additive is very compatible with the base PMMA component, since at levels of additive loading greater than that needed to create a monolayer, excess additive necessarily resided in the bulk, thus it is bulk-miscible.

EXAMPLE 7

Hydration of Entropically-Driven Surface-Segregated Polymer Articles

Figure 8:
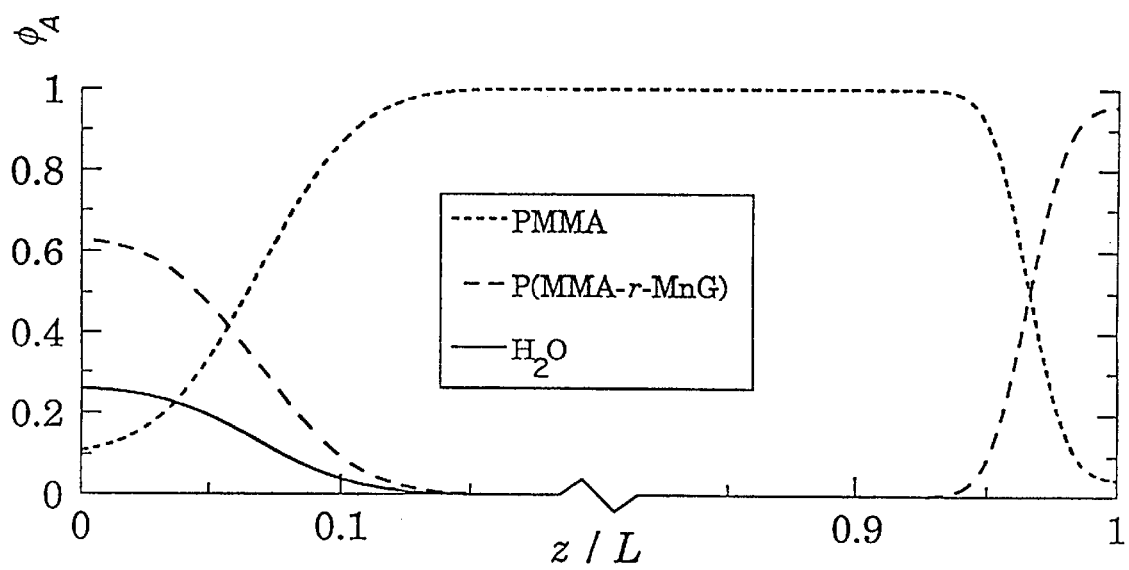
FIG. 8 shows volume fraction profiles for P(MMA-r-MnG)/PMMA-$d_8$ or P(MMA-r-MnG)/PMMA blends hydrated with $H_2O$ or $D_2O$.

P(MMA-r-MnG)/PMMA-$d_8$ and P(MMA-r-MnG)/PMMA blends were hydrated with $H_2O$ and $D_2O$, respectively. Films were formed as described above to thicknesses of about 800 Å. In particular, a 20% blend of 40,700 g/mol P(MMA-r-MnG) in 314,000 g/mol PMMA-$d_8$ was formed, as well as similar blends using 330,000 g/mol PMMA. Reflectivity and scattering length density profiles were obtained before and after hydration as well as after re-drying. The volume fraction profile of FIG. 8 describes both systems. A 27% equilibrium water content is seen at the surface, roughly corresponding to three water molecules per ethylene oxide unit. This shows that P(MMA-r-MnG) copolymers are hydrophilic additives, as are surfaces enriched with these additives in blends with PMMA. The bulk properties remain essentially intact, that is, a glassy, transparent, polymeric material.

These results compare to poly(hydroxy ethyl methacrylate) (PHEMA), the main constituent of soft contact lenses, which also has a contact angle 10° less than pure PMMA, with an equilibrium water content of approximately 40% (Garbassi, et al., *Polymer Surfaces: From Physics to Technology*, John Wiley & Sons, West Sussex, 1994).

EXAMPLE 8

Protein Adsorption Study of Polymeric Articles of Example 3

Figure 9:
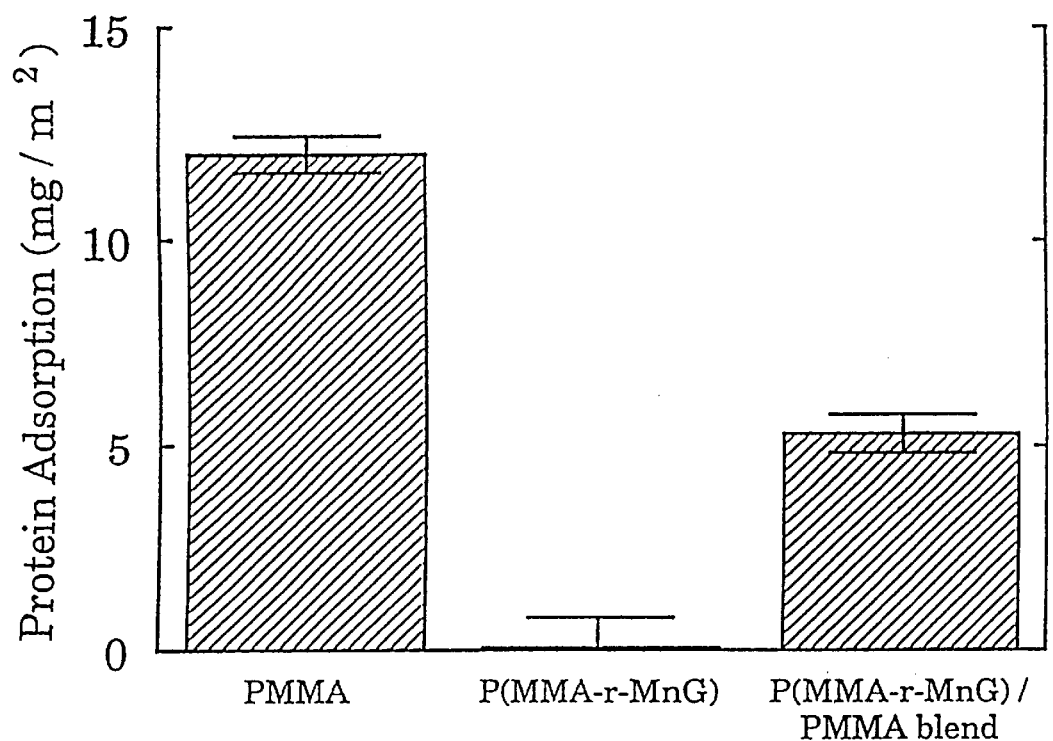
FIG. 9 shows protein adsorption on PMMA, P(MMA-r-MnG), and a blend of the two, respectively.

Protein adsorption studies were performed with≈800 Å thick samples prepared as in Example 3 on 1 cm diameter double-sided polished silicon wafers. These films were exposed to a mixture of unlabeled and $^{14}C$-labeled bovine serum albumin (BSA) (obtained from Sigma Chemical Co. and American Radiolabeled Chemical Inc., respectively) in a buffered water solution (0.01 M phosphate and 0.15 M NaCl with pH=7.0) and equilibrated by shaking for 6 hours. By comparing a treated sample's degree of radioactivity with that of the solution, the amount of BSA irreversibly adsorbed to the surface was determined (FIG. 9). The surface of the blend of the invention including branched random copolymer additive with PMMA demonstrates a reduction in protein adsorption compared with pure PMMA (for comparison, a demonstration of protein absorption of the pure copolymer additive, which effectively inhibits all protein adsorption, is shown). The degree of BSA adsorption for the film with 20% P(MMA-r-MnG) is consistent with a 60% surface coverage of this material as shown by NR.

EXAMPLE 9

Protein Adsorption Study of Thick Polymeric Article

Figure 10:
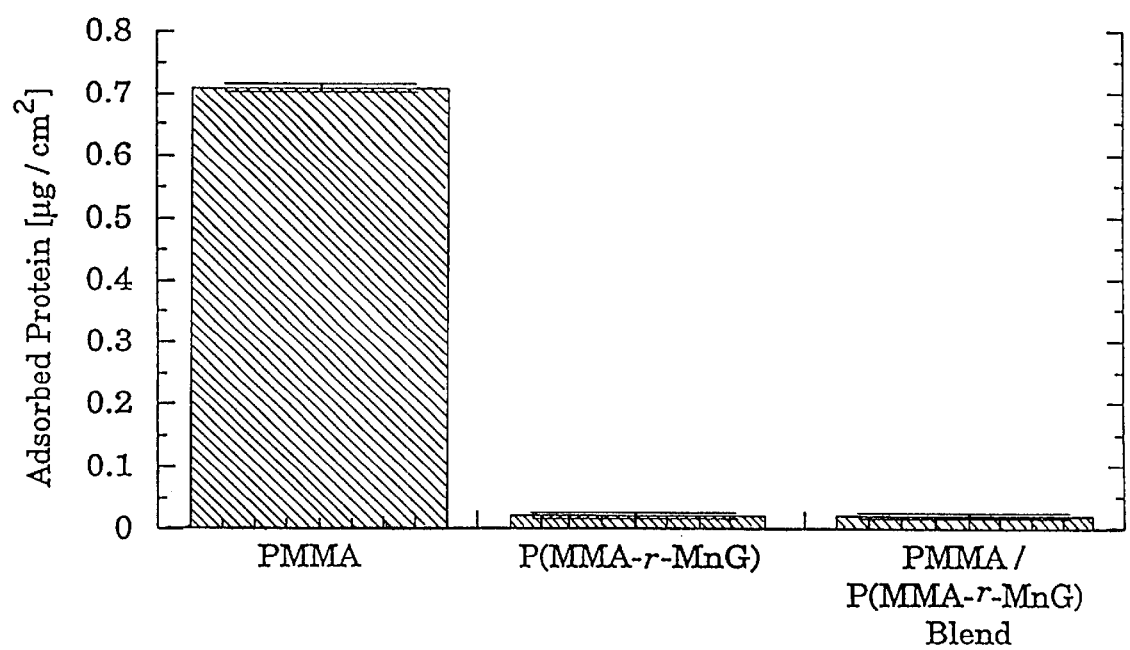
FIG. 10 shows amount of HSA irreversibly adsorbed onto surfaces of thick polymer films of P(MMA-r-MnG), P(MMA-r-MnG)/PMMA blends, and PMMA.
Figure 11:
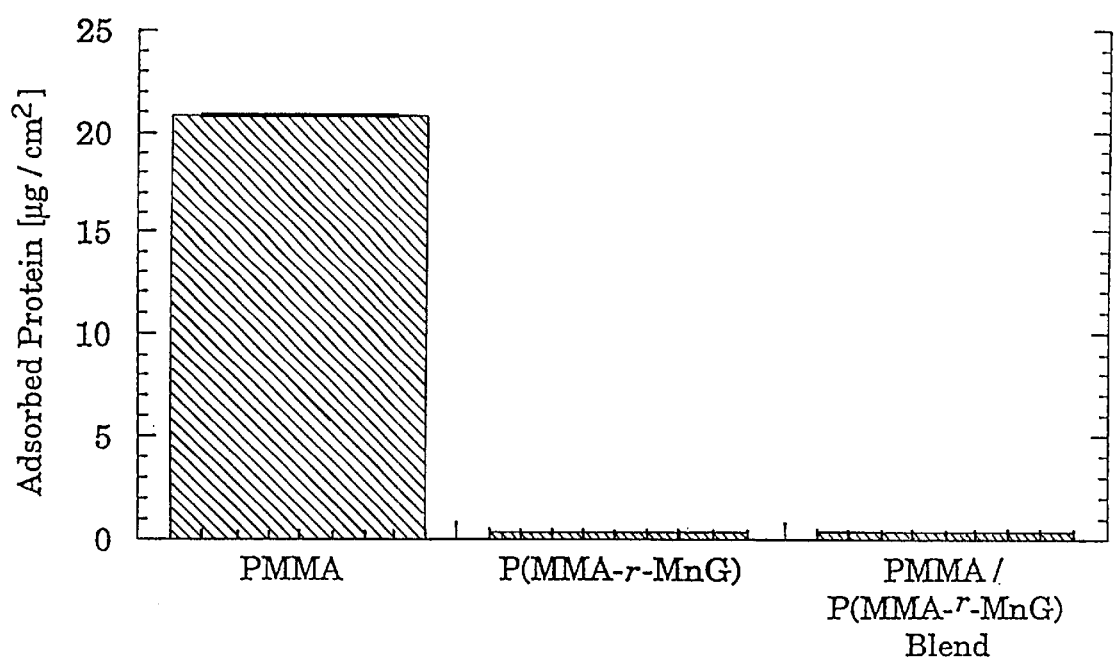
FIG. 11 shows amount of ECC irreversibly adsorbed onto surfaces of thick polymer films of P(MMA-r-MnG), P(MMA-r-MnG)/PMMA blends, and PMMA.

Protein adsorption studies were performed on articles as described above but of thickness of approximately 2000 Å. Specifically, adsorption studies were performed on double-sided polished silicon wafers (Semiconductor Processing Co.) using HSA (68,000 g/mol) and equine cytochrome-c (ECC), 12,000 g/mol) (both from Sigma). The protein adsorption resistance was examined using two proteins with different molecular weights in order to compare results with a recent study reporting that with grafted PEO surfaces, lower-molecular-weight proteins need higher grafting densities to effectively resist a protein adsorption ([133]). Samples were exposed to a mixture of $^{125}I$-labeled and unlabeled proteins in 0.0M phosphate buffer solution (PBS; pH=7.4). After 3.5 hours, the samples were rinsed with saline solution and the degree of radioactivity of each sample was measured. FIGS. 10 and 11 show the results for HSA and ECC, respectively. In both cases, irrespective of molecular weight, both pure P(MMA-r-MnG) and P(MMA-r-MnG)-enriched PMMA surfaces almost completely inhibit protein adsorption compared to the pure PMMA samples, indicating that the surface of a P(MMA-r-MnG)/PMMA blend does indeed, as shown by neutron reflectivity, resemble pure P(MMA-r-MnG).

EXAMPLE 10

Cell Adhesion Studies

Figure 12:
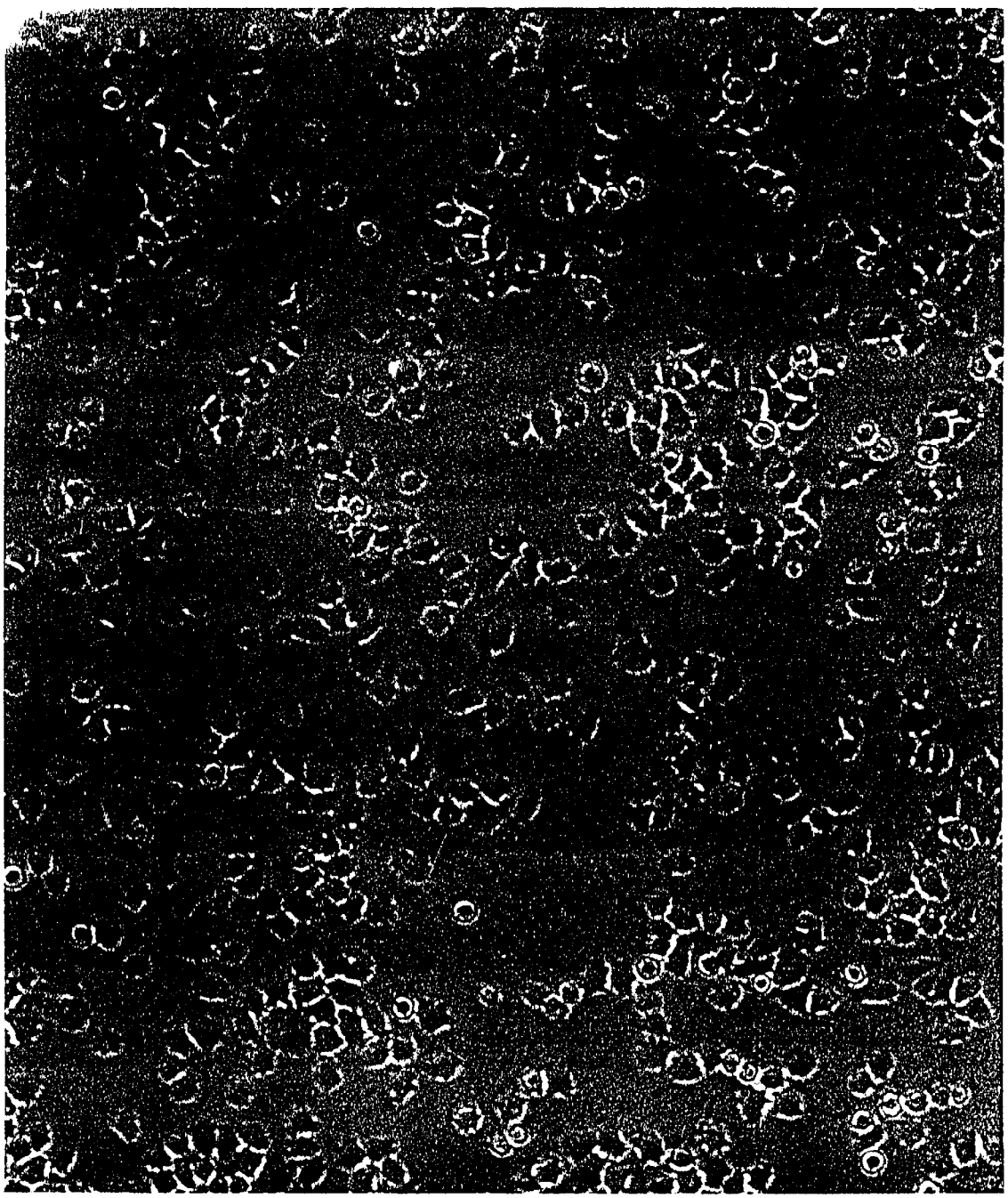
FIG. 12 is a photocopy of a photomicrograph of CHO LA cells on PMMA.
Figure 13:
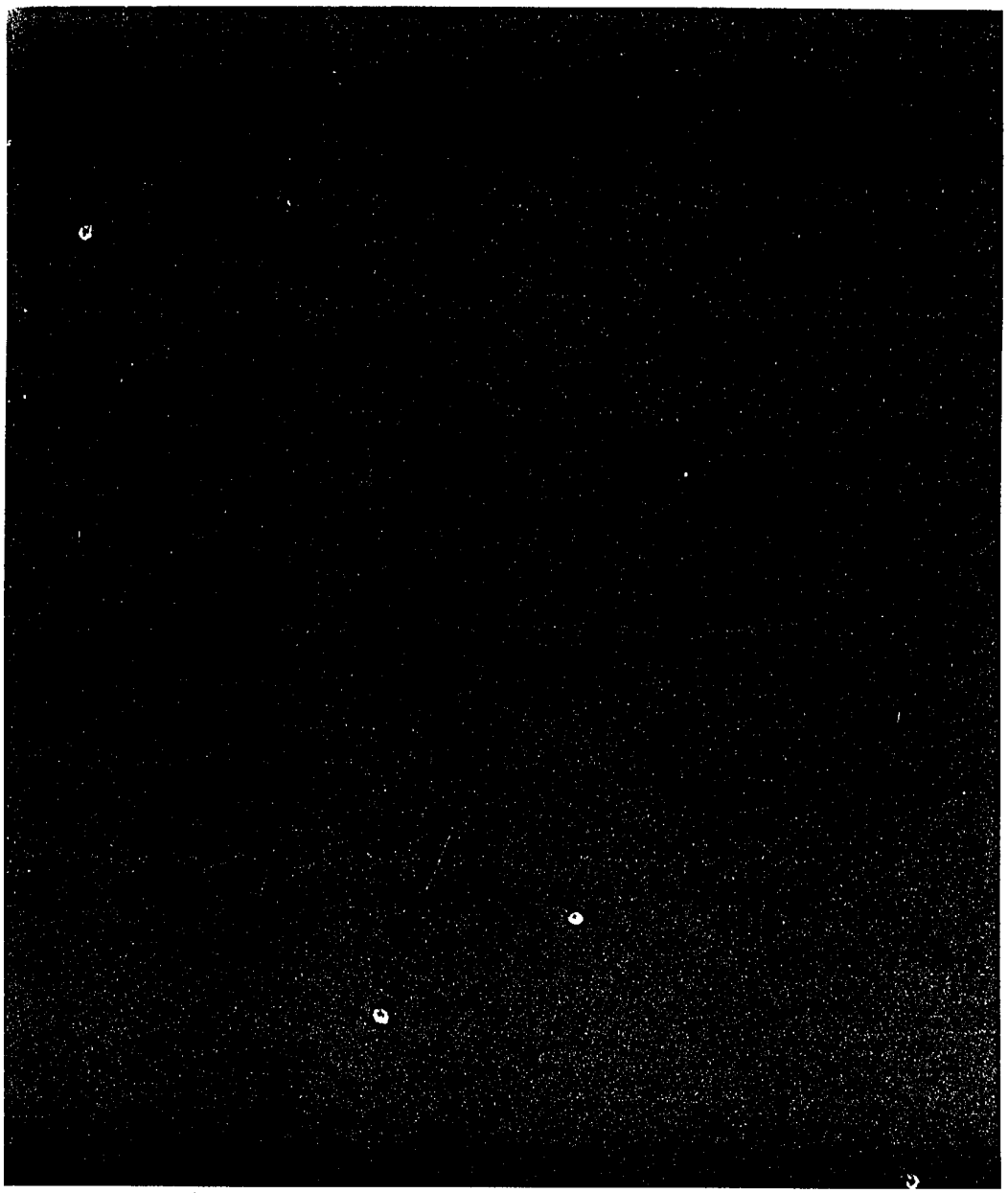
FIG. 13 is a photocopy of a photomicrograph of CHO LA cells on P(MMA-r-MnG)
Figure 14:
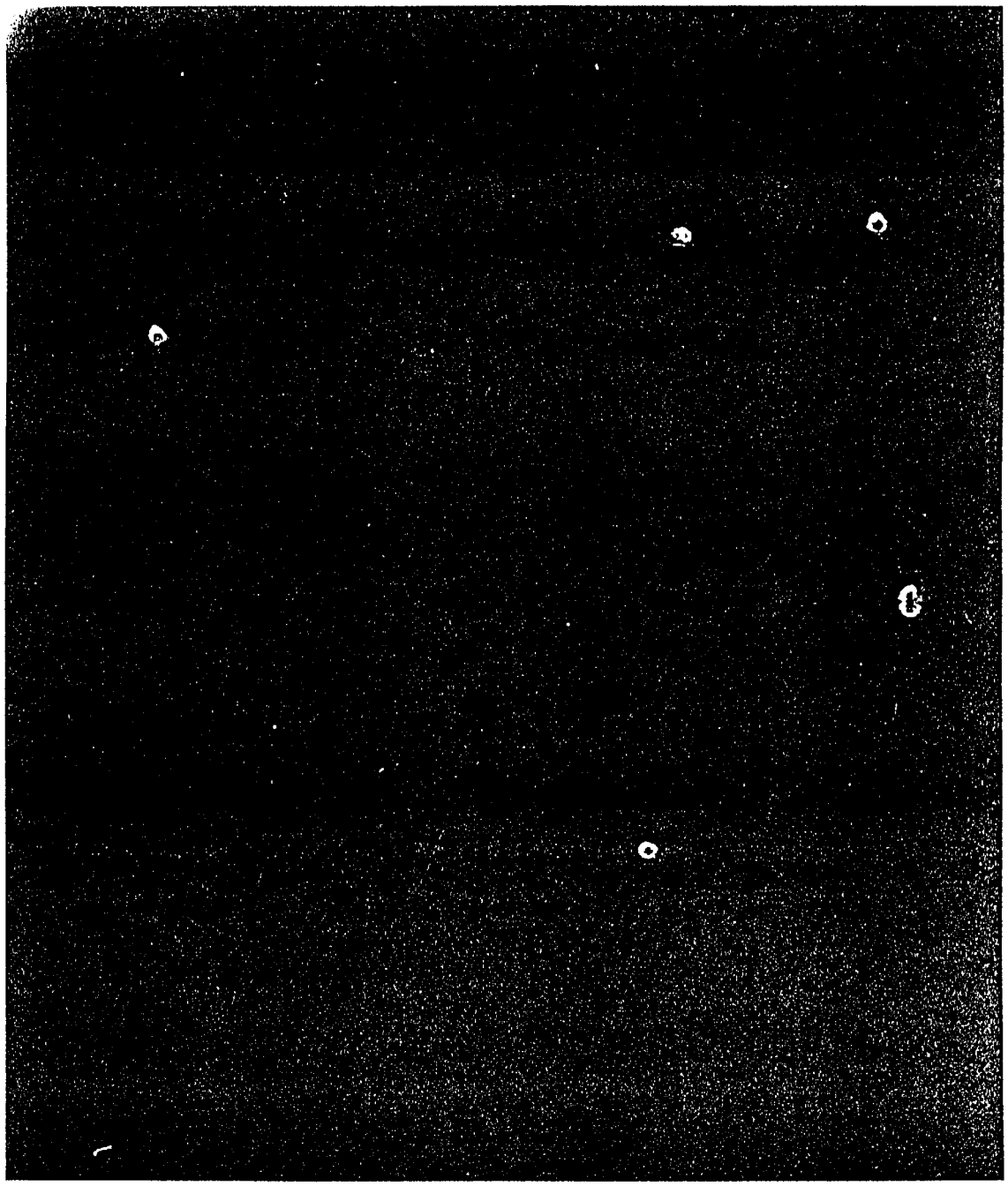
FIG. 14 is a photocopy of a photomicrograph of CHO LA cells on a 20% blend of P(MMA-r-MnG) in PMMA.

Films were prepared as described above and were exposed to Chinese hamster ovary cells (CHO LA). Cells were incubated in a 10% $CO_2$ environment at 37° C., trypsinized, and collected by centrifugation. After further incubation for four hours, the cells on PMMA strongly adsorbed and spread (FIG. 12) while CHO LA adsorption on pure P(MMA-r-MnG) (FIG. 13) and the P(MMA-r-MnG)/ PMMA blend (FIG. 14) was limited and spreading was negligible.

These cell studies and the protein adsorption experiments concur with the NR and contact angle measurements, showing that the surface of the blend is completely covered with the branched additive.

EXAMPLE 11

Preparation of a Membrane Having a Hydrophilic Surface via Selective Segregation of a Branched Hydrophilic Additive to the Surface A branched hydrophilic additive, P(MMA-r-MnG), as described above, was synthesized having approximately 40 PEG side chains statistically distributed along the 200-unit long methacrylate backbone. Polymer membranes were prepared from this material and poly(vinylidene fluoride) (PVDF) by phase inversion casting. P(MMA-r-MnG) and PVDF were co-dissolved in the ratio of 10:90 by mass in N, N-dimethyl formamide. This solution was cast onto a glass plate and coagulated in water at room temperature, resulting in a membrane containing 10% P(MMA-r-MnG) by mass, corresponding to 3.8 mol % P(MMA-r-MnG). Membranes were subsequently dehydrated by freeze-drying. The freeze-dried membranes were shown by scanning electron microscopy to be highly porous. X-ray photoelectron spectroscopy measurements conducted on freeze-dried membranes showed a near-surface composition of 16 mol % P(MMA-r-MnG). This near-surface composition corresponds to approximately 25% by volume of hydrophilic PEG segments.

EXAMPLE 12

(Prophetic) Synthesis of Chelating Functionality for Polymer Blend

Figure 15:
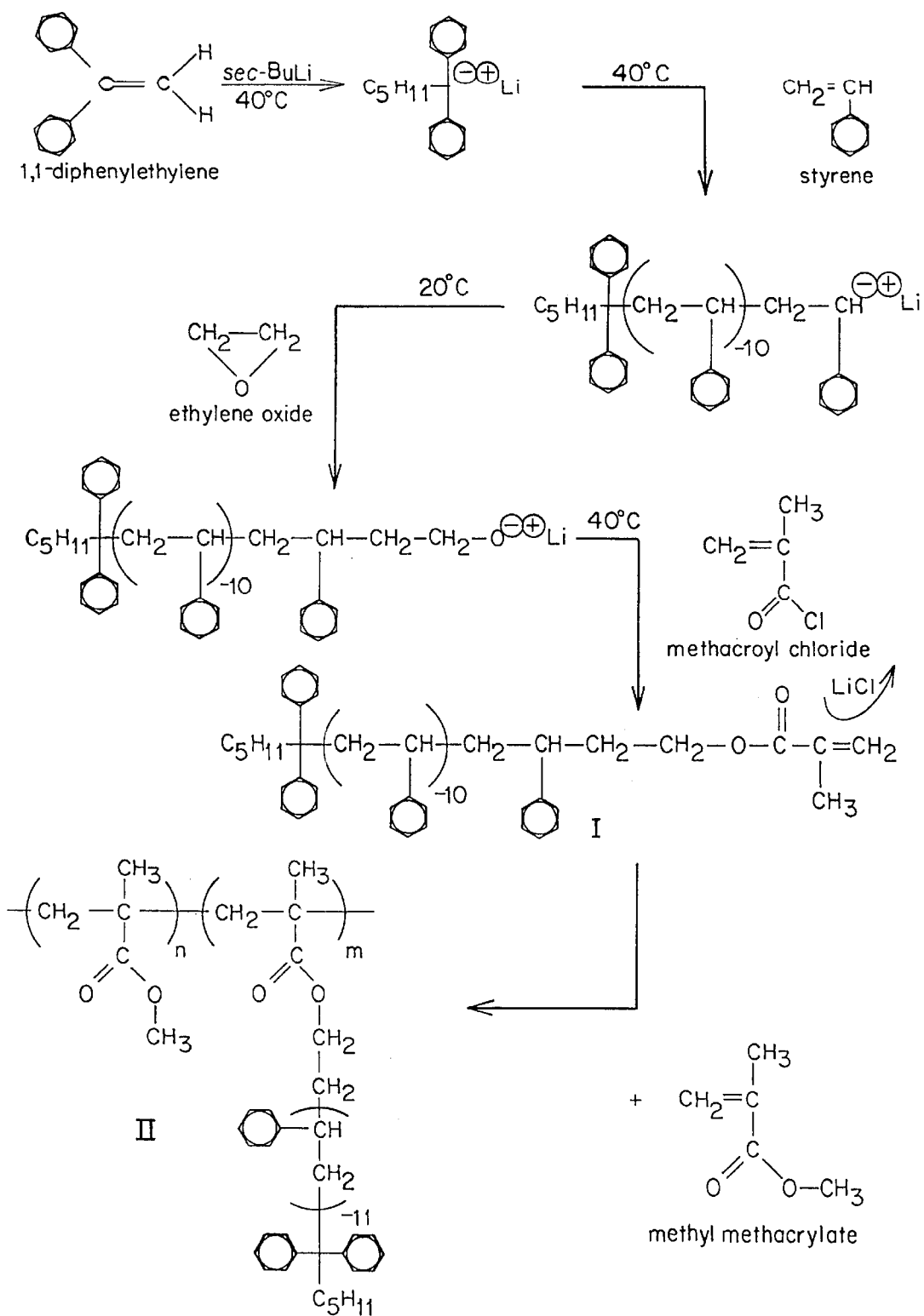
FIG. 15 is a scheme illustrating a first portion of a chemical root to the synthesis of a branched polymeric component capable of chelating a metal ion.
Figure 16:
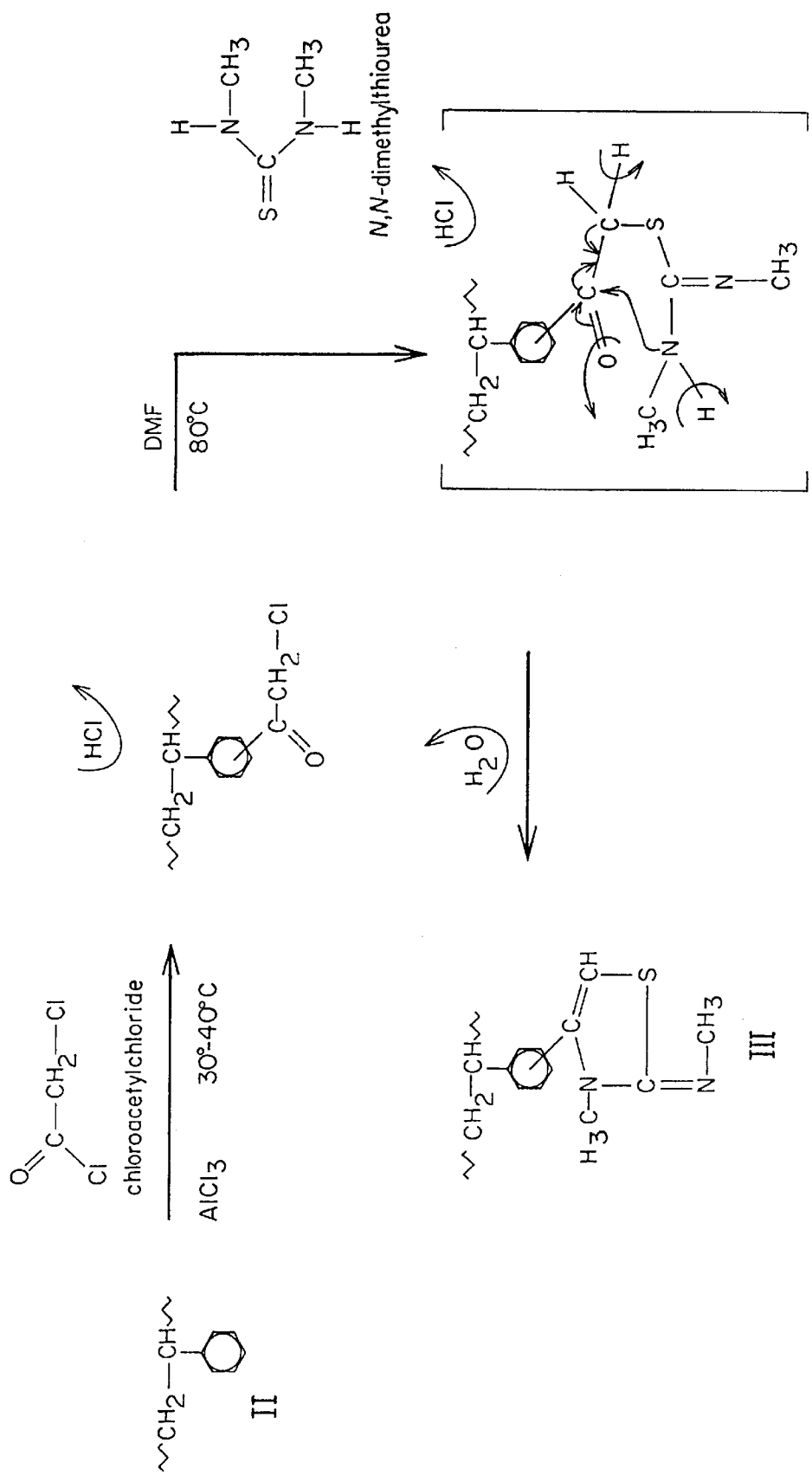
FIG. 16 is a scheme of a second portion of a chemical root to the synthesis of a branched component capable of chelating a metal ion.

FIGS. 15 and 16 are schemata illustrating a chemical route to the synthesis of a second, branched component capable of chelating mercury(II). This synthesis takes advantage of the vulnerability of the styrene aromatic ring to electrophilic substitution. The branched component III (FIG. 16) has a methyl methacrylate backbone, for compatibility with PVDF. Each side chain has approximately 10 styrene repeat units, to which are attached thiazoline groups which are highly selective for mercury(II).

The methyl methacrylate-terminated polystyrene macromonomer I (FIG. 15) is prepared using the anionic procedure of Schulz, et al., "Graph Polymers With Macromonomers, I, Synthesis From Methacrylate-Terminating Polystyrene", *J. Appl. Poly. Sci.* 27, 4773–86, (1982). Styrene monomer is purified by distillation over excess calcium hydride. The initiator is sec-butyllithium, ligated with 1,1-diphenylethylene. The reaction is carried out in benzene, out of which the impurities are titrated by adding sec-butyllithium slowly via syringe until a light tan-orange color is maintained. Purified styrene monomer and sec-butyllithium are then charged into the reactor according to the relationship:

Degree of Polymerization=[mol Monomer]/[mol Initiator]

The polymerization reaction is carried out for 30 minutes at 40° C., under nitrogen. The reactor temperature is then reduced to 20° C., and the living styryl anions are capped by the introduction into the reactor of excess liquid ethylene oxide. The formation of the ethylene oxide anion is indicated by a disappearance of the orange color of the styryl anion. The reactor temperature is then increased to 40° C., and the chains are terminated by the additions of excess methacroyl chloride. The methyl methacrylate-terminated polystyrene macromonomer I is recovered by dropwise addition of the benzene solution to methanol.

While it is possible to terminate the living styryl anion directly with methacroyl chloride, Schulz, et al. found that this led to side reactions due to attack of the extremely basic styryl anion on the carbonyl or alpha hydrogen of methacroyl chloride. These reactions were avoided by first endcapping the stryl anion with ethylene oxide, which presents a less basic alkoxy anion.

The comb polymer II (FIG. 15) is obtained by random copolymerization of the polystyrene macromonomer with methyl methacrylate, using standard anionic or free radical methods. It is desirable to have as many polystyrene branches as possible, while retaining compatibility with PVDF. The first comb polymers are made with approximately 20 mole percent polystyrene macromonomers. Compatibility with PVDF is checked by spin-coating thin films of blends of II with PVDF. Any phase separation will result in cloudiness in the thin films. The thin films may also be examined for phase separation under the optical microscope.

Functionalization of II with mercury-selective thiazoline groups (FIG. 16) is achieved using a two-step procedure following Sugii, et al. ("Preparation and Properties of Macroreticular Resins-Containing Thiazole and Thiazoline Group" *Talanta*, 27, 627–31, 1980), who prepared crosslinked polystyrene beads functionalized with this group. The comb polymer II is first dissolved in a suitable solvent at 30–40° C., to which finely ground anhydrous aluminum chloride is added. Chloroacetyl chloride then is added, and the reactor is stirred at 30–40° C. for 6 h. Electrophilic aromatic substitution of chloroacetyl chloride takes place by the well-known Friedel-Crafts acylation reaction. The product is isolated by pouring the reaction mixture into ice water, which precipitates the polymer and liberates the $AlCl_3$ catalyst from a complex which it forms with the substituted acyl group. Completion of the reaction is verified by infrared (IR) spectroscopy in potassium bromide discs. The comb polymer II will have characteristic adsorption bands at 1670 cm$^{-1}$ ($v_{C=O}$) and 650 cm$^{-1}$ ($\lambda_{C-Cl}$) [105].

For the second step in the functionalization procedure, the polymer is redissolved in N,N-dimethylformamide (DMF). Excess N,N'-dimethylthiourea is then added, and the mixture is stirred at 80° C. for 6 h. The functionalized comb polymer III is then precipitated by dropwise addition of the reaction mixture to methanol. Completion of the reaction may be confirmed by observation of characteristic IR adsorption bands at 2760 cm$^{-1}$ ($v_{N-CH_3}$) and 1620 cm$^{-1}$ ($v_{C=N}$).

Polymer III can be used as a mercury-selective membrane additive. Sugii, et al. (above) found that crosslinked polystyrene functionalized with the thiazoline group and used as a column adsorbent was very effective in isolating mercury from highly saline solutions. The adsorbent was highly selective for mercury. The presence of other metal ions, such as cobalt, nickel, copper, zinc, strontium, barium, lead, and uranium (IV) did not interfere with the chelation of mercury. Similarly, neutral salts, such as sodium chloride, sodium nitrate, sodium sulfate, and sodium thiocyanate, had no effect on the adsorption of mercury. Although mercury was effectively chelated at all pH's, the presence of hydrochloric acid in the feed solution was found to be desirable when rapid adsorption was required. Mercury was effectively recovered from the adsorbent by washing with a solution of 0.1M hydrochloric acid or perchloric acid containing 5% thiourea. The adsorbent was found to be stable in 1–5M solutions of hydrochloric acid, perchloric acid, nitric acid, and sodium hydroxide, and its adsorption capacity for mercury was not affected by treatment with these solutions.

Moreover, the thiazoline functionalized polystyrenes were found to be hydrophilic, compared to unfunctionalized polystyrenes. The polystyrene adsorbent material was immersed in water, kept under reduced pressure for a time, then allowed to stand under atmospheric pressure for 24 h. The material was then centrifuged and weighed, dried at 100° C., and weighed again. The water regain, calculated as the difference in weight, was 1.14 g/g for the thiazoline functionalized polymer, while that for the unfunctionalized polymer was below the detectable limit of weighing apparatus.

Thus, the branched polymer component III can surface-segregate in polymer membranes as a result of both the enthalpic driving force due to the hydrophilicity of its side chains and the entropic driving forces due to its branched nature and the stiffness of the thiazoline groups. Where these driving forces are not sufficient to promote significant surface segregation, poly(ethylene glycol) side chains are incorporated into the methacrylate backbone by the addition of methoxy poly(ethylene glycol) methacrylate macromonomer during the polymerization of II.

EXAMPLE 13

(Prophetic) Synthesis of Gating Functionality for Polymer Blend

Figure 17:
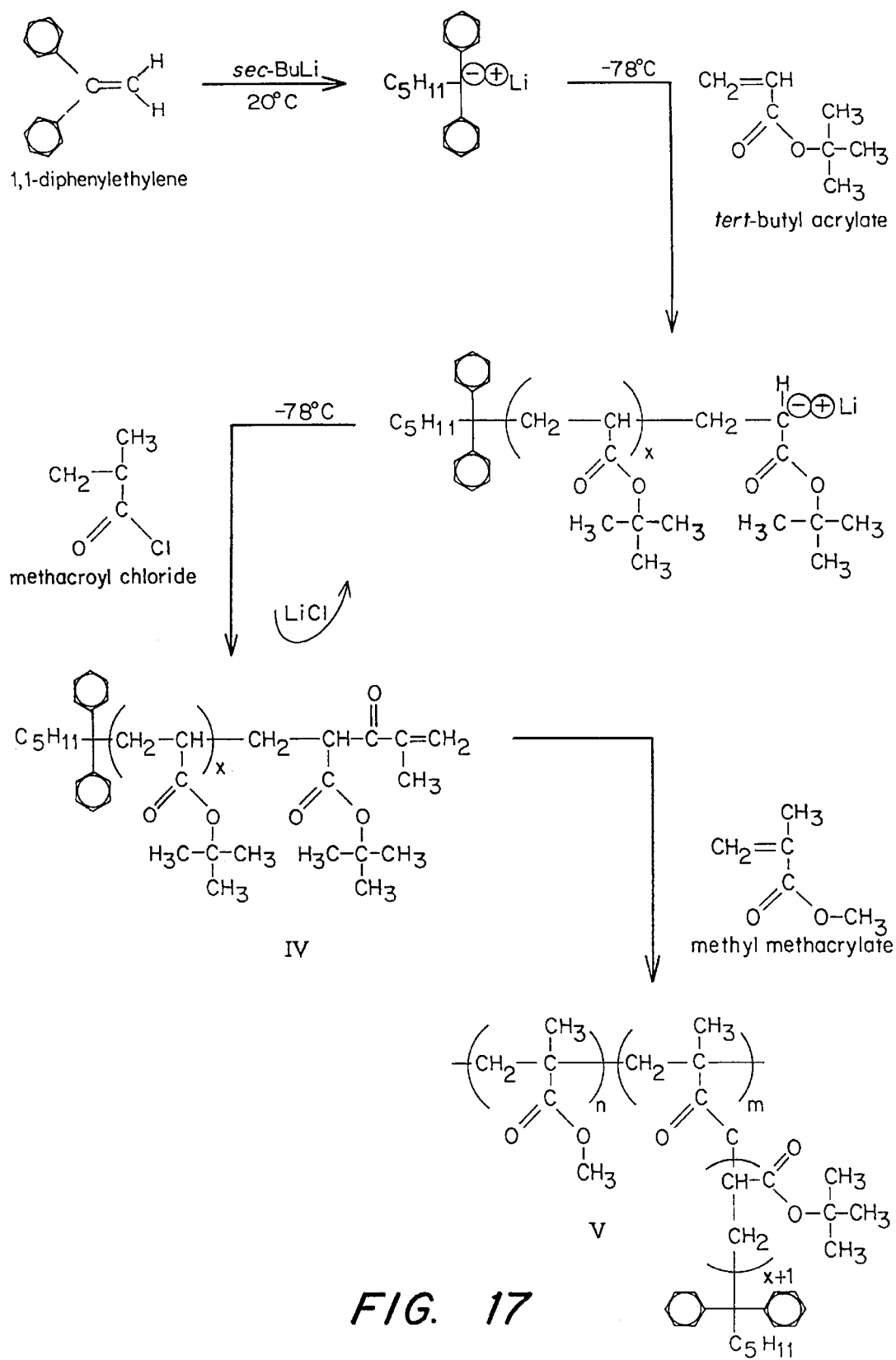
FIG. 17 is a scheme of a first portion of a chemical synthesis of a branched polyacid component for environment sensitive pore gating.
Figure 18:
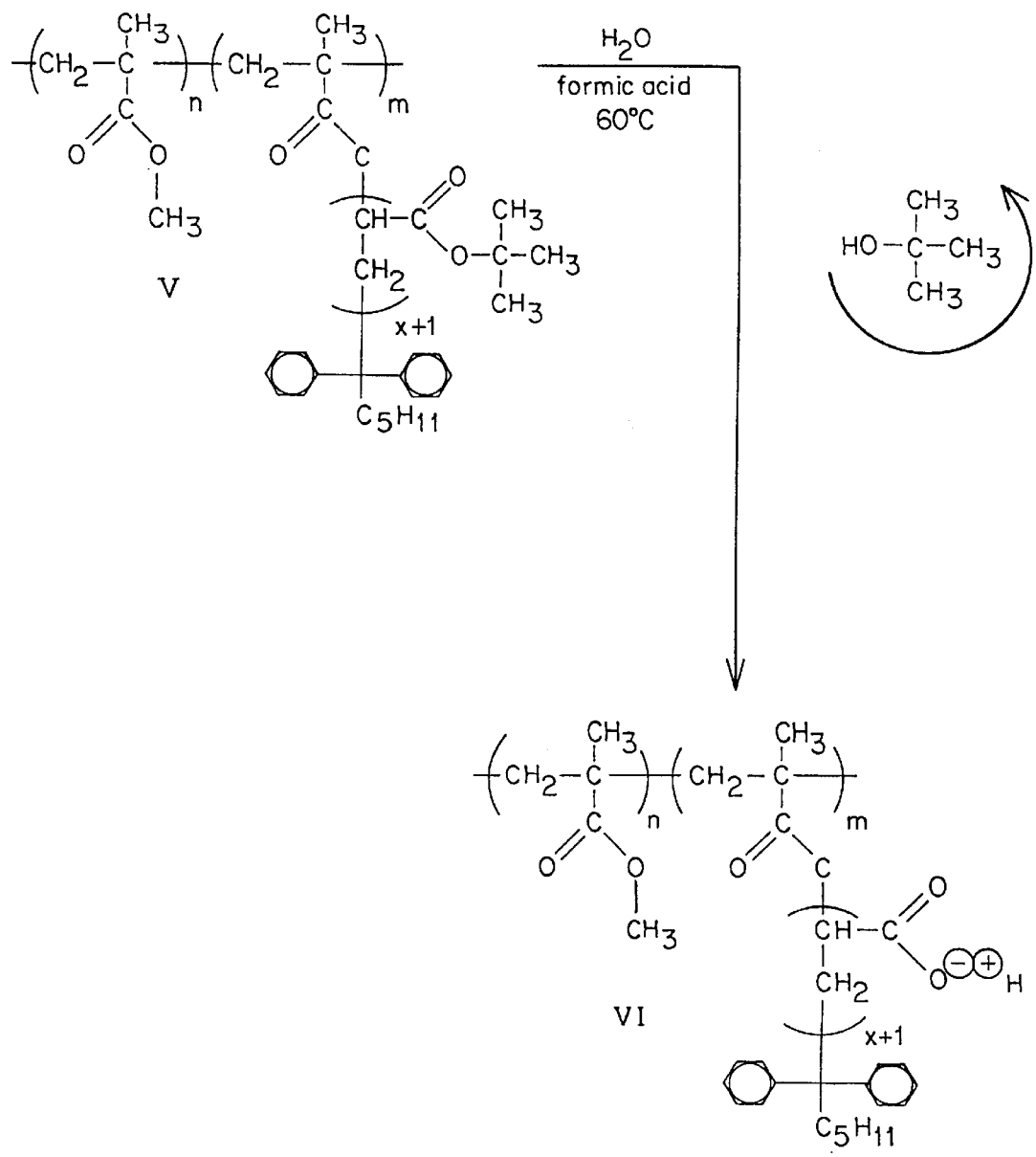
FIG. 18 is a scheme of a second portion of a chemical synthesis of a branched polyacid component for environment sensitive pore gating.

FIGS. 17 and 18 are synthesis schemata for a branched polyacid second component for environment sensitive pore gating. The component VI has a methyl methacrylate backbone, for compatibility with PVDF and insolubility in water. The weakly charged poly(acrylic acid) (PAA) side chains localize at the membrane surface, providing a means for pore gating much like that of the grafted PAA chains reported in the literature. Surface segregation of this component can occur as a result of both an enthalpic driving force due to the solubility of PAA in water and an entropic one due to the branched architecture of the component.

The synthesis strategy for branched component VI is much like that for the mercury chelating component III, in that the side branches are prepared ionically as macromonomers, which are reacted with methyl methacrylate to obtain the comb structure. Because of its ionic nature, however, direct anionic synthesis of acrylic acid to yield PAA is not possible. Thus, the side branches are initially synthesized as poly(tert-butyl acrylate) (PtBA). Once the comb polymer has been obtained, the tert-butyl esters on the side chains are hydrolyzed to yield the hydrophilic PAA analog.

The methyl methacrylate terminated PtBA macromonomer IV is prepared using a procedure following Kubo, et al. ("Solubilization of Peptides in Water and Hexane: Synthesis of Peptide-Terminated Poly(tert-butyl acrylate) and Poly (acrylic acid) via Living Anionic Polymerization", *Macromolecules*, 28, 838–43, 1995). The initiator, sec-butyllithium, is ligated with 1,1-diphenylethylene to prevent back-biting and termination reactions. The sec-butyllithium is added via syringe to distilled THF containing 0.7% LiCl. 1,1-diphenylethylene is then added, resulting in a deep red color. The reaction mixture is then cooled to −78° C., and tert-butyl acrylate is added dropwise using a syringe. Addition of the monomer is indicated by a color change to light yellow. After 30 minutes, the reaction is terminated by the addition of excess methyacroyl chloride. The reaction mixture is warmed to room temperature, and the PtBA macromonomer IV is recovered by dropwise addition of the THF solution to a mixture of methanol and water (1:1 by volume).

The comb polymer V is obtained by random copolymerization of the PtBA macromonomer IV with methyl methacrylate in DMF, using standard anionic or free-radical methods. The PtBA side chains then are deprotected to yield PAA by hydrolysis of the tert-butyl group in formic acid at 60° C. Conversion of PtBA into the polyacid may be confirmed using $^1$H NMR, by observing the disappearance of the tert-butyl peak at 1.4 ppm. Although hydrolysis of the tert-butyl group of PtBA is expected to occur more readily than hydrolysis of the methyl group of PMMA, some hydrolysis of the backbone may occur. This is checked by using $^1$H NMR, and, if necessary, different hydrolysis conditions are used to prevent conversion of the backbone to PAA.

An initial selection of the side chain length can be accomplished as follows. Pore gating will be accomplished through uncoiling of the PAA side chains at high pH to nearly their full-extended configurations (Iwata, et al. "Preparation Properties of Novel Environmental-Sensitive Membranes Prepared by Graft Polymerization Onto a Porous Membrane", *J. Memb. Sci.*, 38, 185–99, 1988), such that they block the membrane pores. The membrane pores in reverse osmosis are typically distributed between 10 and 100 Å. A fully-extended chain length of about 25 Å, then, can produce significant pore restriction. The theoretical length of a fully-extended, all-trans PAA chain is 2.5 Å per repeat unit. Thus, an initial degree of polymerization of roughly 10 acrylic acid repeat units is used. This initial selection is refined as the pore size distributions of other membranes are characterized. The side chain length and frequency is limited by the requirement that the comb component VI remain insoluble in water.

EXAMPLE 14

Preparation of Membrane With Hydrophilic Surface Via Phase Inversion

Membranes were prepared from solutions of 10% polymer in N,N-dimethylformamide (DMF). The solutions were mixed by stirring at room temperature. They were then cast by pipette onto a glass plate having a raised lip around its edge, after which the glass plate was immediately immersed in a bath of deionized water (dW) at room temperature. Membranes were allowed to remain in the coagulation bath for approximately 10 min. after separation from the glass plate was observed. They were then removed and rinsed in a second bath of dW. Some membranes were heat treated while immersed in dW in an apparatus which has been constructed for that purpose. The apparatus is capable of maintaining a constant temperature (±1° C.) in the range from room temperature to boiling. Membranes for electron microscopy, XPS, or gas adsorption measurements were freeze-dried.

Figure 19:
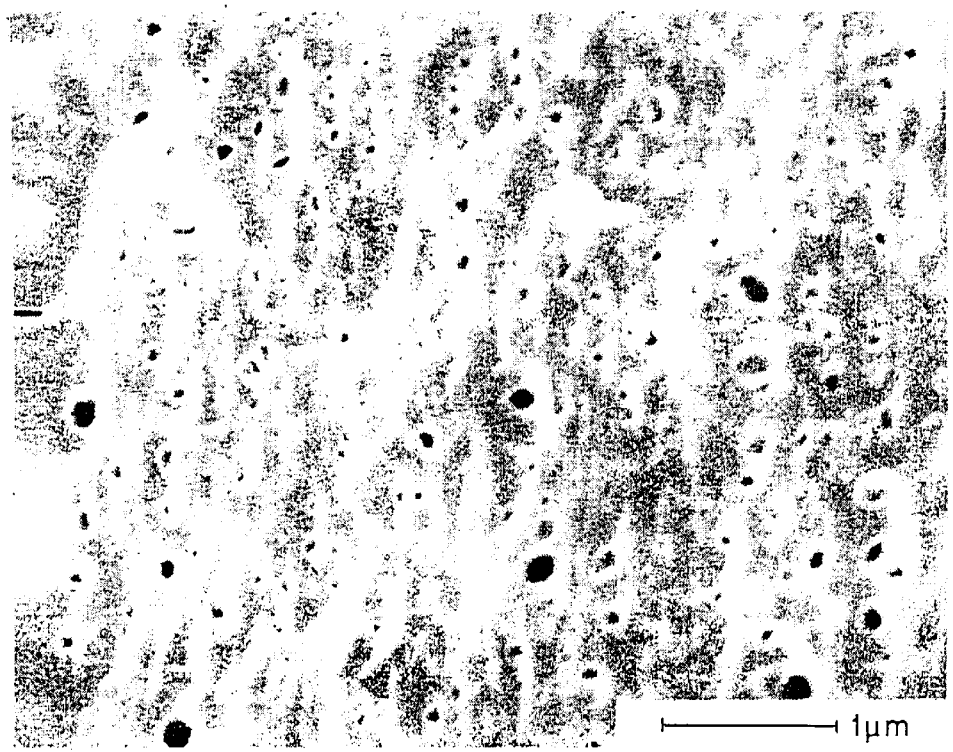
FIG. 19 is a photocopy of a scanning electron micrograph (SEM) image of a membrane (comparative) prepared by phase inversion, from polyvinylidene fluoride (PVDF)
Figure 20:
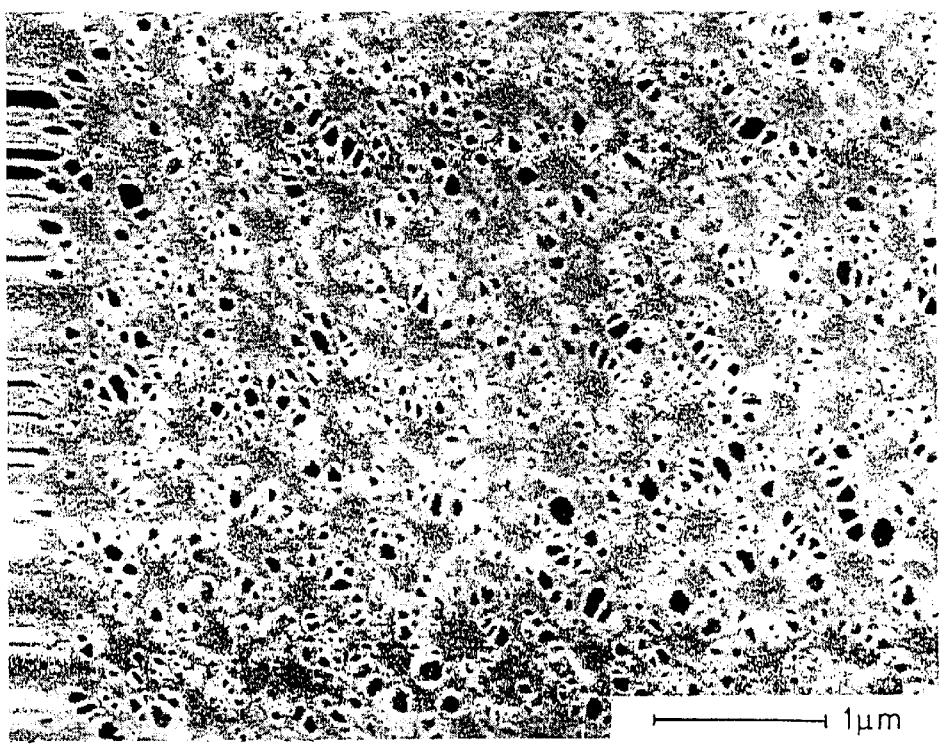
FIG. 20 is a photocopy of an SEM image of a membrane, prepared by phase inversion, from an entangled blend of 80% PVDF and 20% (by weight) P(MMA-r-MnG).

Photocopies of scanning electron microscopy (SEM) studies of the membranes which have been prepared are shown in FIGS. 19 and 20. FIG. 19 is a photocopy of an SEM micrograph of a membrane prepared from 100% PVDF, and FIG. 20 is a photocopy of an SEM micrograph of a membrane prepared from a blend of 80% PVDF and 20% (by weight) P(MMA-r-MnG). It can be seen that the membrane of FIG. 20, including the blend of the invention, is much more porous, thus will facilitate a higher flow rate at the same pore size.

EXAMPLE 15

: (Prophetic) Preparation of Membranes Having Hydrophilic Surfaces

A synthesis technique is carried out as described in example 14, with the following modifications.

Higher polymer concentrations (ca. 20%) are used in casting solutions. The solubility of PVDF in DMF is improved by the addition of ~3% LiCl (Munari, et al., "Casting and Performance of Polyvinylidene Fluoride Based Membranes", *J. Memb. Sci.*, 16, 181–93, 1983). As an alternative, a volatile cosolvent in the casting solution is used to optimize membrane properties. Evaporation of this cosolvent prior to immersion of the cast film in the coagulant results in densification of the surface layer. In addition, the membranes are cast using a doctor blade, to better control film thickness and uniformity.

EXAMPLE 16

Characterization of Membranes

X-ray photoelectron spectroscopy (XPS) studies were carried out to investigate "water side" and "glass side" of membranes fabricated as described above. That is, to determine surface segregation of the second component at the water side, compared to the glass side.

The XPS results make it clear that significant surface segregation of the branched component P(MMA-r-MnG) occurs on the "water side" of the membrane, even without heat treatment. This result may be rationalized if we consider the effect of the steep concentration gradient of water which exists in the active layer of the membrane during its precipitation and gelation. This concentration gradient brings about a macroscopic flux of polymer directed into the casting solution just prior to gelation. According to the Onsager relation for diffusion, this flux is proportional to the gradient in chemical potential of the polymer, which is in turn proportional to the concentration gradient of water. It is this flux, in fact, which is responsible for the formation of the dense surface layer.

In the case of a polymer blend, however, we have two different polymeric components, each of which will experience a different gradient in its chemical potential and thus a different flux into the casting solution. In the case of the blend under consideration, we expect P(MMA-r-MnG) to experience a chemical potential gradient less steep than that of PVDF, due to the solubility of the PEG side chains in water and the extreme hydrophobicity of PVDF. Thus, we expect a comparatively slow macroscopic flux of P(MMA-r-Mng) into the casting solution prior to gelation, resulting in an enrichment of (PMMA-r-MnG) in the dense surface layer of the coagulated film.

On the "glass side" of the membrane, we have a different situation, in that there is virtually no macroscopic concentration gradient of water upon precipitation of the polymer. Thus, we expect only microscopic fluxes of polymer prior to coagulation, as a result of microscopic gradients in the concentration of water. The XPS results indicate only a moderate surface enrichment of the hydrophilic additive component on the "glass side", which is exactly what we might expect based on the absence of the macroscopic gradients in chemical potential upon precipitation.

Heat treatment of the membrane in 90° C. water results in an increase in the degree of surface segregation of the branched component as indicated by XPS.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. An article having a surface and a bulk, comprising an entangled blend of a first polymer component and a second polymer component comprising a copolymer of methyl methacrylate and methoxy-poly(ethylene glycol) methacrylate that is compatible with the first polymer component at room temperature, the second polymer component being more hydrophilic than the first polymer component and being present at the surface of the article in a ratio to the first polymer that is greater than a ratio in the bulk of the article of the second polymer component to the first polymer component.

2. An article as in claim 1, wherein the article defines a porous membrane.

3. An article as in claim 1, wherein the first polymer component is hydrophilic.

4. An article as in claim 1, wherein at least the second polymer component is an acrylic polymer.

5. An article as in claim 4, wherein each of the first and second polymer components is an acrylic polymer.

6. An article as in claim 1, wherein each of the first and second polymer components is insoluble in water.

7. An article as in claim 1, wherein the second polymer component has a polyionic functionality.

8. An article as in claim 1, wherein the second polymer component has a chelating functionality.

9. An article as in claim 1, wherein the second polymer component is more highly branched than the first polymer component.

10. An article as in claim 1, wherein the first polymer component is PVDF.

11. An article as in claim 1, wherein the first polymer component is PMMA.

12. A method comprising providing a miscible blend of at least first and second polymer components each insoluble in water, the first component having a degree of hydrophobicity and the second component comprising a copolymer of methyl methacrylate and methoxy-poly(ethylene glycol) methacrylate being more hydrophilic than the first component, and allowing the components to phase segregate from water to form a porous membrane having a core, and a surface of greater hydrophilicity than the core.

13. A method as in claim 12, further comprising recovering a porous article comprising the blend of the first and second polymer component with the second polymer component present at the surface of the article in a ratio to the first polymer component that is greater than a ratio in the bulk of the article of the first polymer component to the second polymer component.

14. A method comprising:
providing a fluid blend of a first, relatively lower-cohesive-energy polymer component and a second, relatively higher-cohesive-energy polymer component comprising a copolymer of methyl methacrylate and methoxy-poly(ethylene glycol) methacrylate that is compatible with the first polymer component at room temperature; and allowing the blend to harden to form a polymeric article having a surface and a bulk, the second polymer component being present at the surface of the article in a ratio to the first polymer component that is greater than a ratio in the bulk of the article of the second polymer component to the first polymer component.

15. A method of making a polymer membrane having a particular surface chemical functionality, comprising:

providing a polymeric fluid comprising a blend of a first polymer component and a second polymer component comprising a copolymer of methyl methacrylate and methoxy-poly(ethylene glycol) methacrylate that is compatible with the first polymer component at room temperature and that includes a particular chemical functionality;

subjecting the polymeric fluid to phase inversion and recovering an article comprising the blend of the first and second polymer with the second polymer present at the surface of the article in a ratio to the first polymer that is greater than a ratio in a bulk of the article of the second polymer to the first polymer.

16. A method of making a polymer membrane having a particular surface chemical functionality, comprising:

providing a polymeric fluid comprising a blend of a first polymer component and a second polymer component comprising a copolymer of methyl methacrylate and methoxy-poly(ethylene glycol) methacrylate that is compatible with the first polymer component at room temperature;

forming an emulsion by exposing the polymeric fluid to a fluid incompatible with the first and second components and allowing the incompatible fluid to form the emulsion in the polymeric fluid; and recovering from the mixture a porous article comprising the blend of the first and second polymer with the second polymer present at the surface of the article in a ratio to the first polymer that is greater than a ratio in a bulk of the article of the second polymer to the first polymer.

17. A method as in claim 11, wherein article is a porous membrane.

18. A method as in claim 17, involving allowing the second polymer component to be entropically driven to the surface.

19. A method as in claim 17, wherein at least the second polymer component is an acrylic polymer.

20. A method as in claim 17, wherein each of the first and second polymer components is an acrylic polymer.

21. A method as in claim 17, wherein each of the first and second polymer components is insoluble in water.

22. A method as in claim 17, wherein the second polymer component has a polyionic functionality.

23. A method as in claim 17, wherein the second polymer component has a chelating functionality.

24. A method as in claim 17, wherein the second polymer component is more highly branched than the first polymer component.

25. A method as in claim 17, wherein the first polymer component is PVDF.

26. A method as in claim 17, wherein the first polymer component is PMMA.

27. A method as in claim 17, wherein the second polymer component is P(MMA-r-MnG).

* * * * *